US012587887B2

(12) United States Patent
Ren et al.

(10) Patent No.: US 12,587,887 B2
(45) Date of Patent: Mar. 24, 2026

(54) MEASUREMENT AND REPORTING FOR UE-TO-UE INTERFERENCE

(71) Applicant: Qualcomm Incorporated, San Diego, CA (US)

(72) Inventors: Yuwei Ren, Beijing (CN); Chao Wei, Beijing (CN); Huilin Xu, Temecula, CA (US); Yiqing Cao, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 17/421,440

(22) PCT Filed: Jan. 9, 2020

(86) PCT No.: PCT/CN2020/071133
§ 371 (c)(1),
(2) Date: Jul. 8, 2021

(87) PCT Pub. No.: WO2020/143706
PCT Pub. Date: Jul. 16, 2020

(65) Prior Publication Data
US 2022/0095144 A1 Mar. 24, 2022

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04J 11/003* (2013.01); *H04W 72/20* (2023.01); *H04W 72/541* (2023.01)

(58) Field of Classification Search
CPC ... H04W 24/10; H04W 72/20; H04W 72/541; H04W 24/02; H04B 17/318; H04J 11/003
See application file for complete search history.

(56) References Cited

U.S. PATENT DOCUMENTS

2014/0293815 A1 10/2014 Xia et al.
2018/0367346 A1 12/2018 Chen et al.
(Continued)

FOREIGN PATENT DOCUMENTS

CN 103166734 A 6/2013
CN 109088683 A 12/2018
(Continued)

OTHER PUBLICATIONS

International Search Report and Written Opinion—PCT/CN2019/071287—ISA/EPO—Oct. 15, 2019.
(Continued)

*Primary Examiner* — Peter P Chau
(74) *Attorney, Agent, or Firm* — Holland & Hart LLP

(57) ABSTRACT
Methods, systems, and devices for wireless communications are described which provide for efficient backhaul communications and identification of resources for cross-link interference (CLI) measurements and reporting. A common resource pool may be configured in which CLI measurements for resources within the resource pool have a common configuration. When providing information indicating resources that are to be measured for CLI, a bitmap that indicates resources within the common resource pool may be provided with CLI measurement configurations corresponding to the common resource pool configuration. Such a bitmap may be communicated via backhaul connections between neighboring base stations when initiating a CLI measurement. Various described techniques also provide for common configuration for CLI measurements, provide for efficient reporting of CLI measurements, and provide for accurate representation of CLI based on measurements at a victim UE.

24 Claims, 22 Drawing Sheets

(51) Int. Cl.
    H04J 11/00         (2006.01)
    H04W 72/20       (2023.01)
    H04W 72/541     (2023.01)

(56)           References Cited

U.S. PATENT DOCUMENTS

| | | | | |
|---|---|---|---|---|
| 2020/0213052 A1* | 7/2020 | Li | ............... | H04W 72/23 |
| 2020/0344614 A1* | 10/2020 | Takano | ............... | H04B 17/345 |
| 2021/0250797 A1* | 8/2021 | Karjalainen | ......... | H04B 7/0626 |
| 2021/0328746 A1* | 10/2021 | Sandberg | .......... | H04W 72/0446 |

FOREIGN PATENT DOCUMENTS

| | | |
|---|---|---|
| WO | WO-2015043633 A1 | 4/2015 |
| WO | WO-2018202144 A1 | 11/2018 |
| WO | WO-2018223386 A1 | 12/2018 |

OTHER PUBLICATIONS

International Search Report and Written Opinion—PCT/CN2020/071133—ISA/EPO—Mar. 26, 2020.

Qualcomm Incorporated: "Dynamic TDD UE to UE measurement Considerations", 3GPP TSG RAN WGI Meeting NR#3, R1-1716449, Sep. 21, 2017 (Sep. 21, 2017), pp. 1-4, the whole document.

Samsung: "Discussion on Joint CLI Measurement and Beam Management", 3GPP TSG RAN WG1 Meeting #91, R1-1720307, 3rd Generation Partnership Project (3GPP), Mobile Competence Centre, 650, Route Des Lucioles, F-06921, Sophia-Antipolis Cedex, France, Dec. 1, 2017 (Dec. 1, 2017), 4 pages, XP051368955, Retrieved from the Internet: URL: http://www.3gpp.org/ftp/tsg%5Fran/WG1%5FRL1/TSGR1%5F91/Docs/ paragraph 2.

ZTE: "UE-to-UE Measurement as an Enabler for CLI Mitigation Schemes", 3GPP TSG RAN WG1 Meeting #90, R1-1712281, Aug. 21, 2017-Aug. 25, 2017, Aug. 11, 2017 (Nov. 8, 2017), 8 Pages, Section 2, The Whole document.

CMCC: "Discussion on UE-to-UE Cross-Link Interference Management", 3GPP TSG RAN WG1 NR Ad-Hoc#2, R1-1710784, 3rd Generation Partnership Project, Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, 3 Pages, Jun. 26, 2017, XP051299988, p. 1-p. 3, Sections 2, 3, the whole document.

Supplementary European Search Report—EP20738250—Search Authority—Munich—Sep. 23, 2022.

* cited by examiner 810          815          820

805

Communications Manager 950  951

CLI Resource Manager 960    920

Measurement
Component 965    925

Receiver

945

946

CLI Transmission
Manager

975  Transmitter

980

976

970    930

CLI Configuration
Manager 955    935

910

940

915

905

900

1210

1215

1220

1205

1200

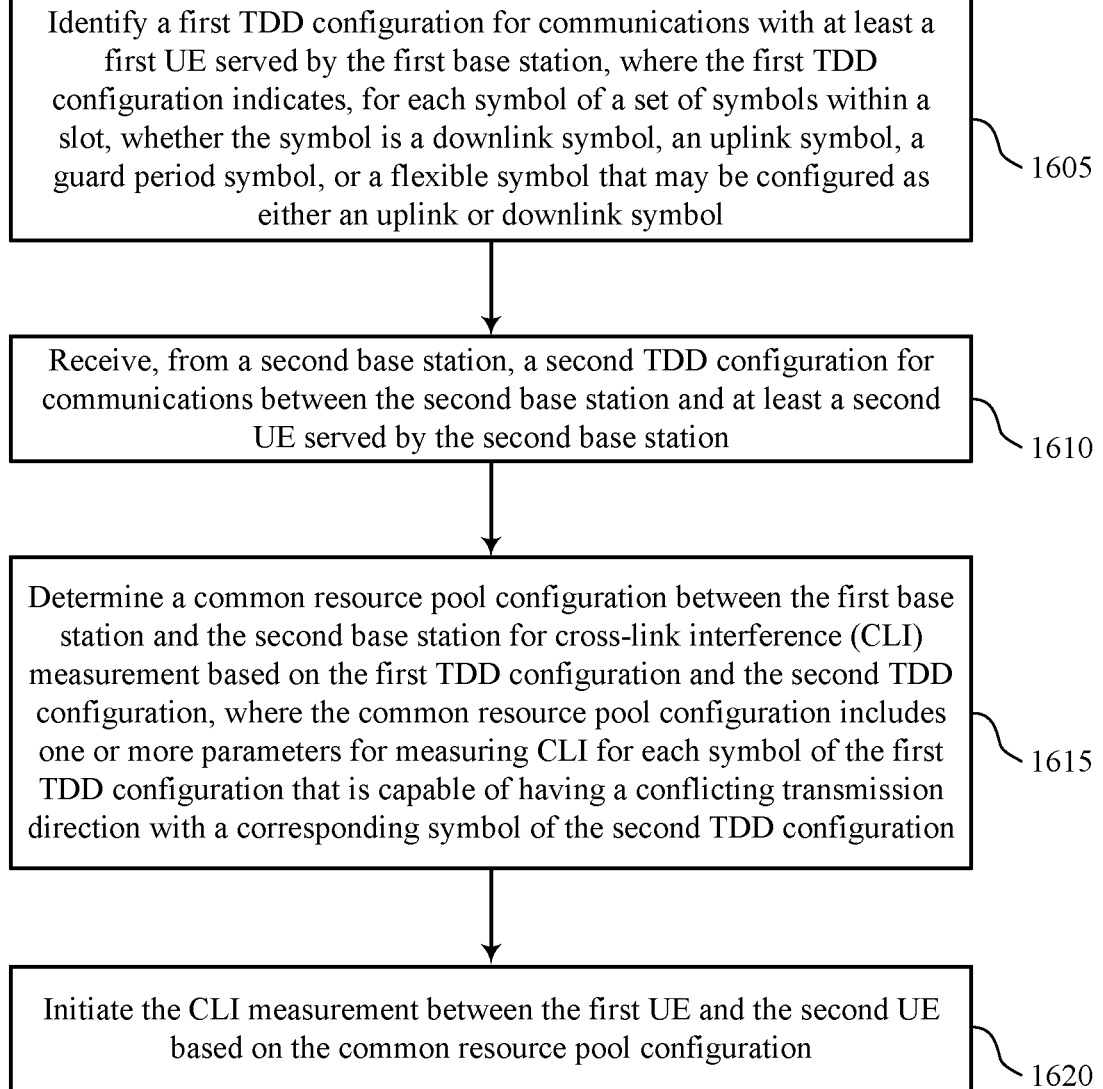

Identify a first TDD configuration for communications with at least a first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol

1605

Receive, from a second base station, a second TDD configuration for communications between the second base station and at least a second UE served by the second base station

1610

Determine a common resource pool configuration between the first base station and the second base station for cross-link interference (CLI) measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration

1615

Initiate the CLI measurement between the first UE and the second UE based on the common resource pool configuration

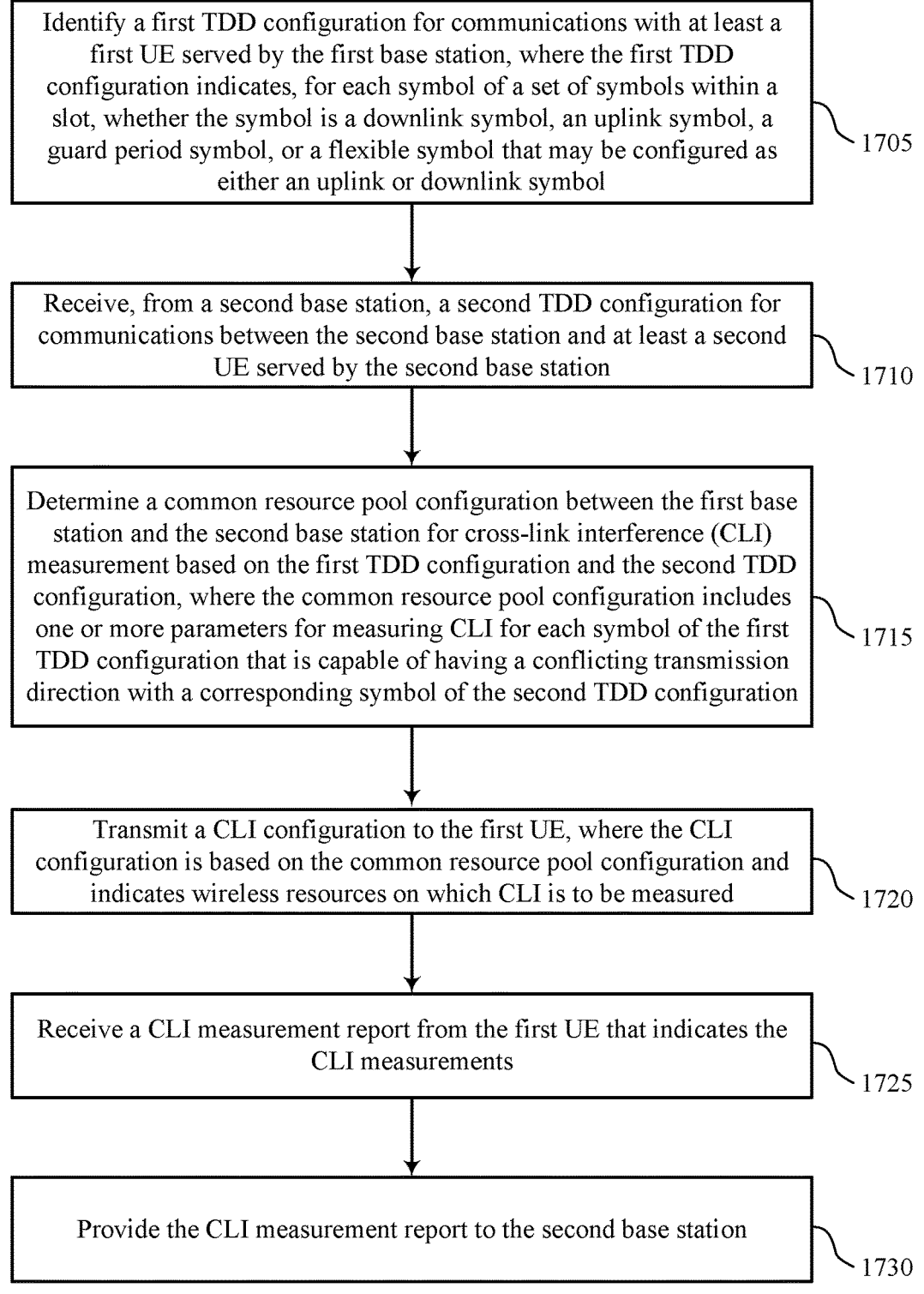

Identify a first TDD configuration for communications with at least a first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol

1705

Receive, from a second base station, a second TDD configuration for communications between the second base station and at least a second UE served by the second base station

1710

Determine a common resource pool configuration between the first base station and the second base station for cross-link interference (CLI) measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration

1715

Transmit a CLI configuration to the first UE, where the CLI configuration is based on the common resource pool configuration and indicates wireless resources on which CLI is to be measured

1720

Receive a CLI measurement report from the first UE that indicates the CLI measurements

1725

Provide the CLI measurement report to the second base station

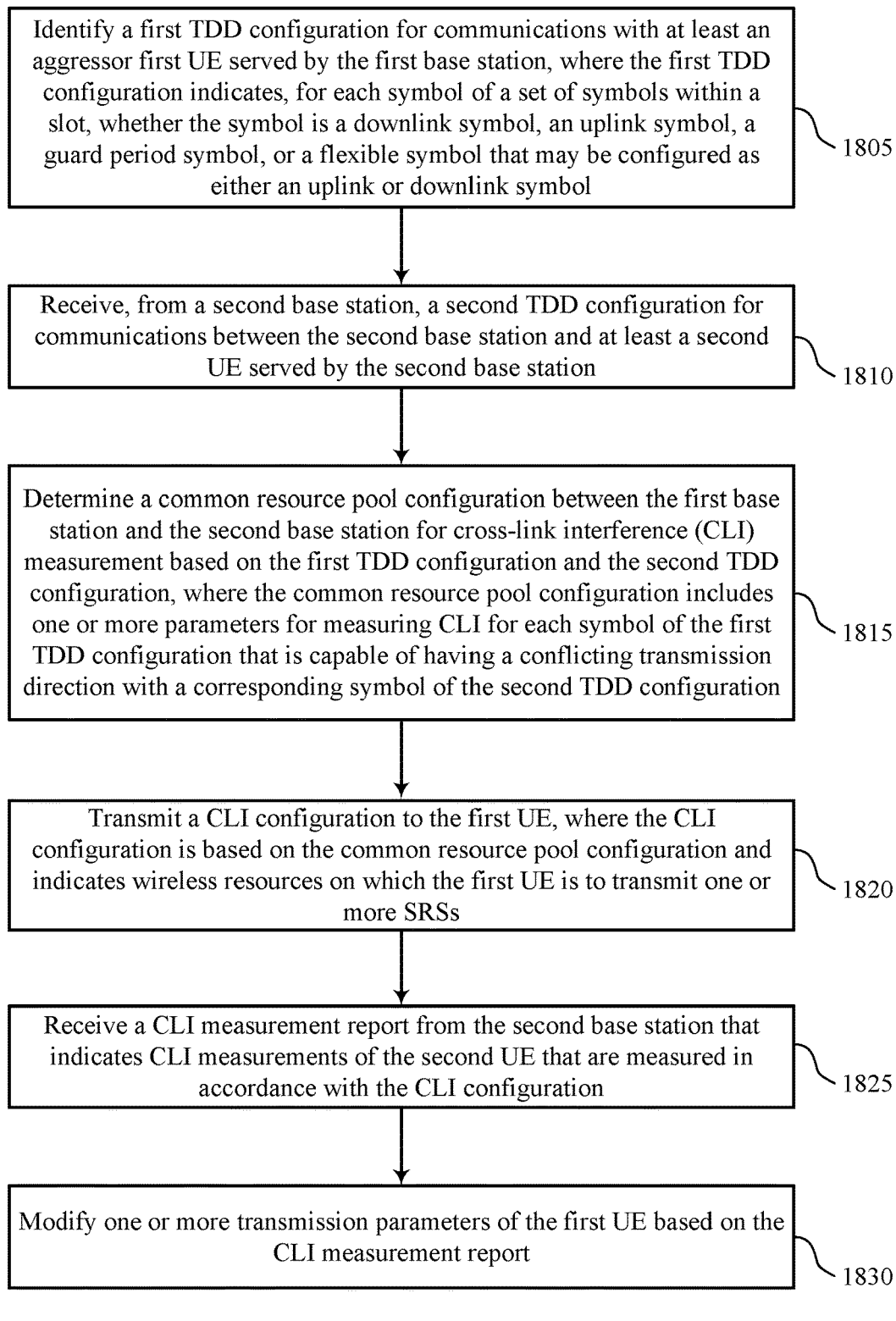

Identify a first TDD configuration for communications with at least an aggressor first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol

1805

Receive, from a second base station, a second TDD configuration for communications between the second base station and at least a second UE served by the second base station

1810

Determine a common resource pool configuration between the first base station and the second base station for cross-link interference (CLI) measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration

1815

Transmit a CLI configuration to the first UE, where the CLI configuration is based on the common resource pool configuration and indicates wireless resources on which the first UE is to transmit one or more SRSs

1820

Receive a CLI measurement report from the second base station that indicates CLI measurements of the second UE that are measured in accordance with the CLI configuration

1825

Modify one or more transmission parameters of the first UE based on the CLI measurement report

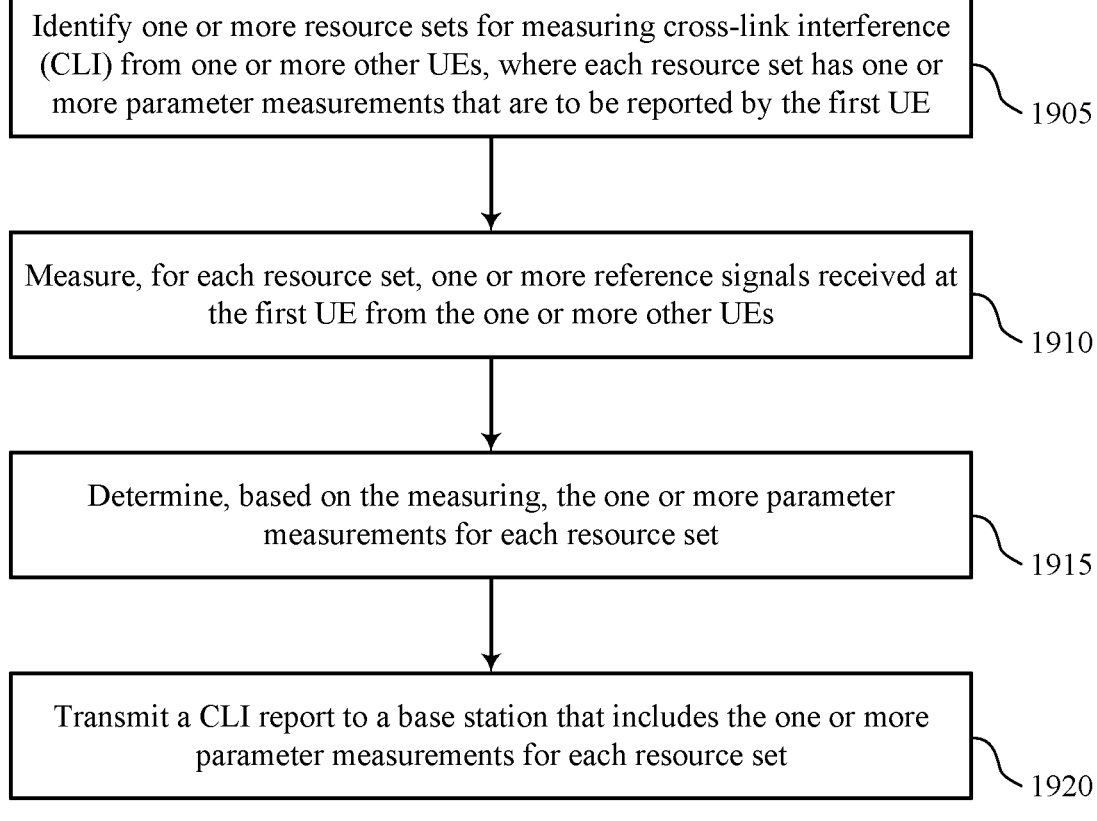

Identify one or more resource sets for measuring cross-link interference (CLI) from one or more other UEs, where each resource set has one or more parameter measurements that are to be reported by the first UE

1905

Measure, for each resource set, one or more reference signals received at the first UE from the one or more other UEs

1910

Determine, based on the measuring, the one or more parameter measurements for each resource set

1915

Transmit a CLI report to a base station that includes the one or more parameter measurements for each resource set

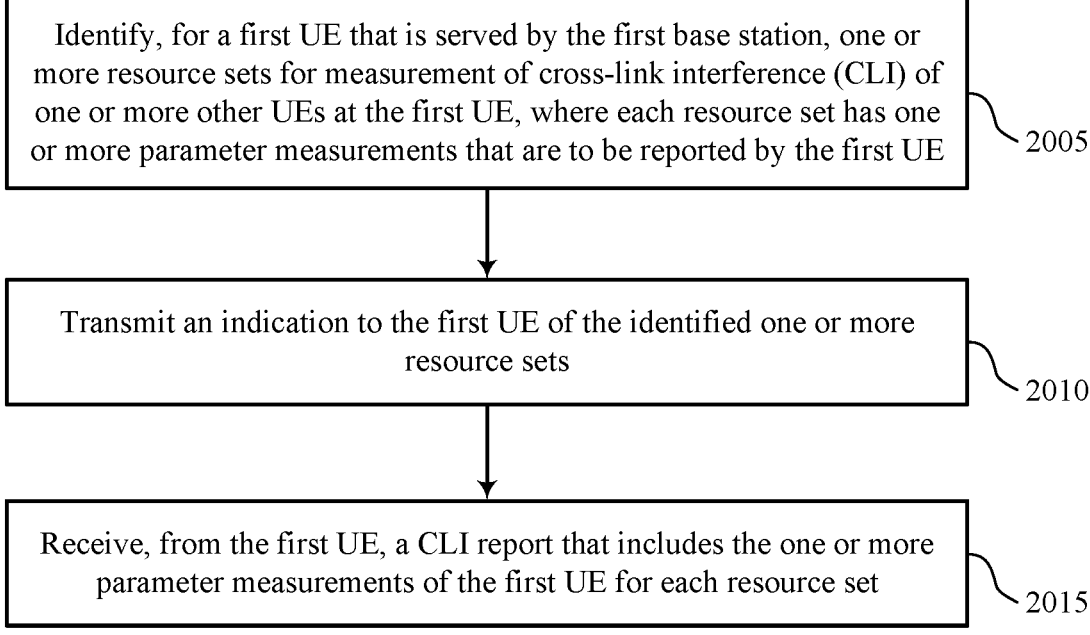

Identify, for a first UE that is served by the first base station, one or more resource sets for measurement of cross-link interference (CLI) of one or more other UEs at the first UE, where each resource set has one or more parameter measurements that are to be reported by the first UE

2005

Transmit an indication to the first UE of the identified one or more resource sets

2010

Receive, from the first UE, a CLI report that includes the one or more parameter measurements of the first UE for each resource set

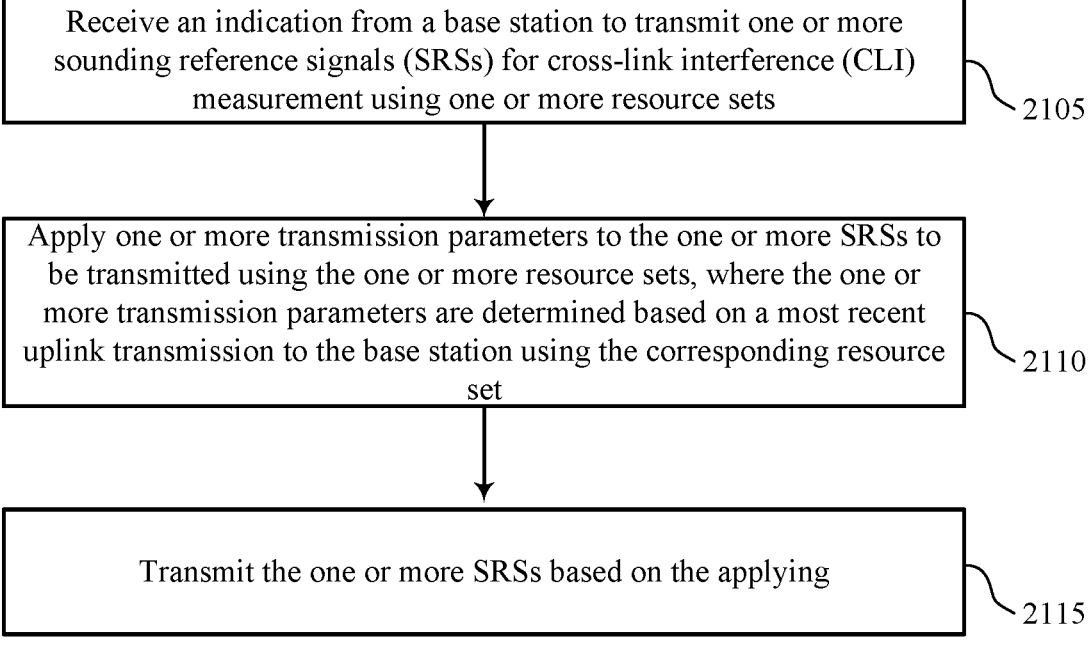

Receive an indication from a base station to transmit one or more sounding reference signals (SRSs) for cross-link interference (CLI) measurement using one or more resource sets ⌐ 2105

Apply one or more transmission parameters to the one or more SRSs to be transmitted using the one or more resource sets, where the one or more transmission parameters are determined based on a most recent uplink transmission to the base station using the corresponding resource set ⌐ 2110

Transmit the one or more SRSs based on the applying ⌐ 2115

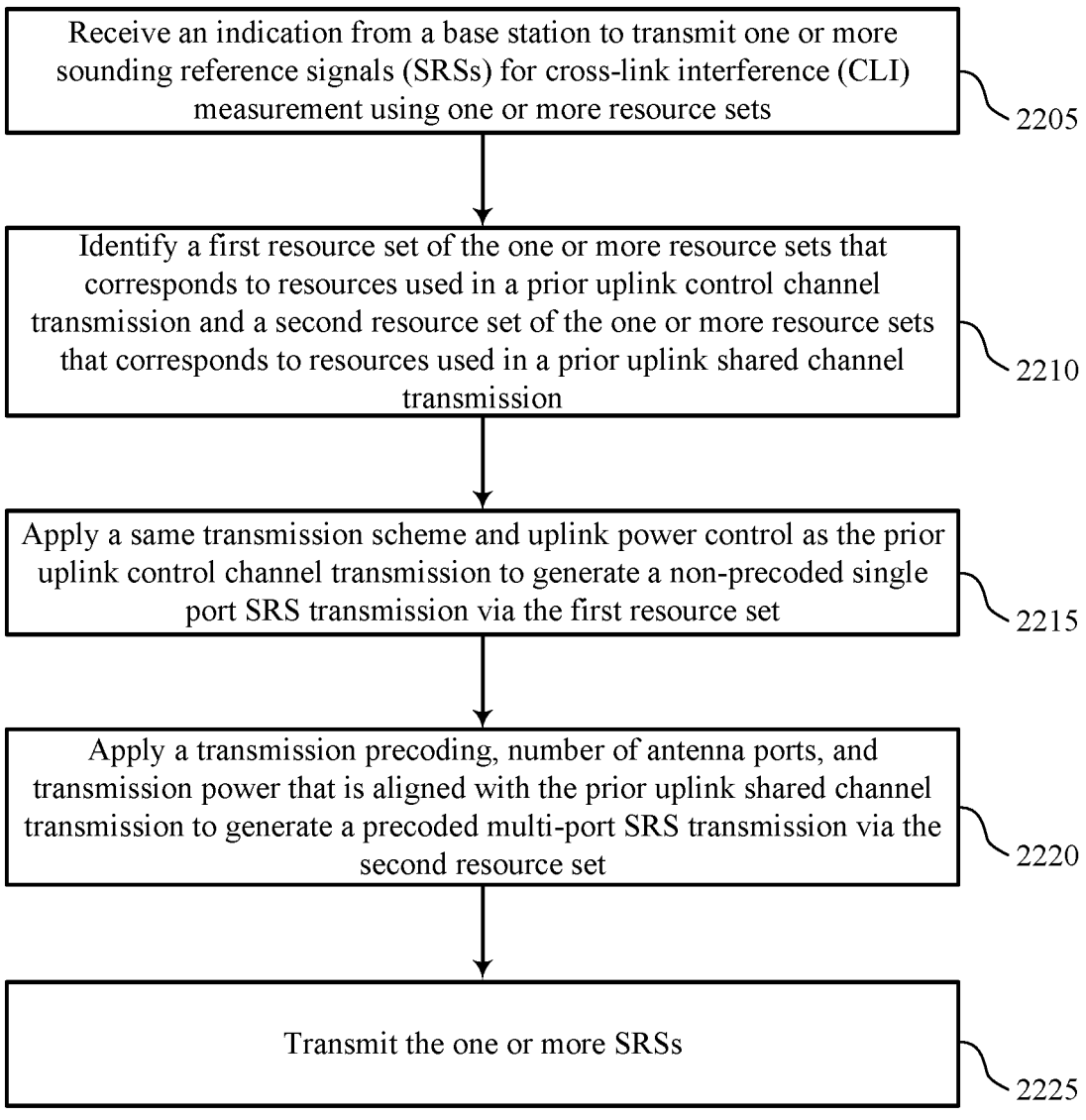

Receive an indication from a base station to transmit one or more sounding reference signals (SRSs) for cross-link interference (CLI) measurement using one or more resource sets

2205

Identify a first resource set of the one or more resource sets that corresponds to resources used in a prior uplink control channel transmission and a second resource set of the one or more resource sets that corresponds to resources used in a prior uplink shared channel transmission

2210

Apply a same transmission scheme and uplink power control as the prior uplink control channel transmission to generate a non-precoded single port SRS transmission via the first resource set

2215

Apply a transmission precoding, number of antenna ports, and transmission power that is aligned with the prior uplink shared channel transmission to generate a precoded multi-port SRS transmission via the second resource set

2220

Transmit the one or more SRSs

MEASUREMENT AND REPORTING FOR UE-TO-UE INTERFERENCE

CROSS REFERENCE TO RELATED APPLICATIONS

The present application is a 371 national phase filing of International Patent Application No. PCT/CN2020/071133 by Ren et al., entitled "MEASUREMENT AND REPORTING FOR UE-TO-UE INTERFERENCE," filed Jan. 9, 2020, and claims priority to PCT/CN2019/071287 by Ren et al., entitled "MEASUREMENT AND REPORTING FOR UE-TO-UE INTERFERENCE," filed Jan. 11, 2019, each of which is assigned to the assignee hereof, and each of which is expressly incorporated by reference in its entirety herein.

FIELD OF INVENTION

The following relates generally to wireless communications, and more specifically to measurement and reporting for UE-to-UE interference.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, wireless communications systems may use time division duplexing (TDD) to provide downlink transmissions from a base station to a UE and uplink transmissions from a UE to a base station in a time-alternating manner according to a TDD configuration. Such a TDD configuration may provide a sequence of uplink and downlink transmissions for time intervals (e.g., slots, symbols, subframes, etc.) within a time period (e.g., a frame, subframe, slot, etc.). In some cases, neighboring base stations, or cells, may operate in a TDD deployment, and may use different TDD configurations, which may result in adjacent cells having opposite transmission directions in some time intervals. Such opposite transmission directions may result in interference at UEs. For example, an uplink transmission by a first UE may interfere with downlink reception at a second UE if the uplink transmission and downlink reception are scheduled for a same time interval. Interference between UEs served by different base stations in a TDD system may be known as cross-link interference (CLI). Efficient identification and mitigation of excessive CLI may help to improve the efficiency and reliability of a wireless communications system.

SUMMARY

The described techniques relate to improved methods, systems, devices, and apparatuses that support measurement and reporting for UE-to-UE cross-link interference (CLI). Various described techniques provide for efficient backhaul communications and identification of resources for CLI measurements and reporting. In some cases, a common resource pool may be configured in which CLI measurements for resources within the resource pool have a common configuration (e.g., transmission bandwidth, transmission duration, periodicity and slot offset of the resource pool, a sounding reference base sequence, and the like). When providing information indicating resources that are to be measured for CLI, a bitmap that indicates resources within the common resource pool may be provided with CLI measurement configurations corresponding to the common resource pool configuration. Such a bitmap may be communicated via backhaul connections between neighboring base stations when initiating a CLI measurement, and in some cases may be communicated to a UE to indicate CLI measurements that are to be performed.

In some cases, one or more resource sets for measuring CLI may be configured, where each resource set may include one or more parameter measurements that are to be reported by a UE. In some cases, the one or more parameter measurements may include measurements of a reference signal (e.g., a sounding reference signal (SRS)) that is transmitted by an aggressor UE, measurements of an uplink data transmission (e.g., physical uplink shared channel (PUSCH) or physical uplink control channel (PUCCH) transmissions) of the aggressor UE, or combinations thereof. In some cases, the measurements may be made by a victim UE and reported to a serving base station using a layer-one (L1) reference signal received power (RSRP) parameter of a channel state information (CSI) reporting mechanism.

In some cases, an aggressor UE may be configured to transmit a SRS in one or more symbols that are to be measured for CLI at a victim UE. In such cases, in order to provide an accurate representation of CLI that would be present for a non-SRS PUSCH or PUCCH transmission, the aggressor UE may apply one or more transmission parameters to the SRS transmission that are determined based on a most recent uplink transmission to the base station using the corresponding resource (e.g., precoding used in a prior PUSCH transmission of a symbol may be applied to the SRS transmission during the corresponding symbol).

A method of wireless communication at a first base station is described. The method may include identifying a first TDD configuration for communications with at least a first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol, receiving, from a second base station, a second TDD configuration for communications between the second base station and at least a second UE served by the second base station, determining a common resource pool configuration between the first base station and the second base station for CLI measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration, and initiating the CLI measurement between the first UE and the second UE based on the common resource pool configuration.

An apparatus for wireless communication at a first base station is described. The apparatus may include a processor, memory in electronic communication with the processor, and instructions stored in the memory. The instructions may be executable by the processor to cause the apparatus to identify a first TDD configuration for communications with at least a first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol, receive, from a second base station, a second TDD configuration for communications between the second base station and at least a second UE served by the second base station, determine a common resource pool configuration between the first base station and the second base station for CLI measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration, and initiate the CLI measurement between the first UE and the second UE based on the common resource pool configuration.

Another apparatus for wireless communication at a first base station is described. The apparatus may include means for identifying a first TDD configuration for communications with at least a first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol, receiving, from a second base station, a second TDD configuration for communications between the second base station and at least a second UE served by the second base station, determining a common resource pool configuration between the first base station and the second base station for CLI measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration, and initiating the CLI measurement between the first UE and the second UE based on the common resource pool configuration.

A non-transitory computer-readable medium storing code for wireless communication at a first base station is described. The code may include instructions executable by a processor to identify a first TDD configuration for communications with at least a first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol, receive, from a second base station, a second TDD configuration for communications between the second base station and at least a second UE served by the second base station, determine a common resource pool configuration between the first base station and the second base station for CLI measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration, and initiate the CLI measurement between the first UE and the second UE based on the common resource pool configuration.

In some examples of the method, apparatuses, and non-transitory computer-readable medium described herein, the one or more parameters for measuring CLI include one or more of a transmission bandwidth, a transmission duration, a periodicity and slot offset of the resource pool, or any combinations thereof. In some examples of the method, apparatuses, and non-transitory computer-readable medium described herein, the CLI measurement may be based on a measurement at the first UE of a SRS transmitted by the second UE, and where the one or more parameters for measuring CLI further include a SRS base sequence for the SRS transmitted by the second UE.

In some examples of the method, apparatuses, and non-transitory computer-readable medium described herein, the determining may include operations, features, means, or instructions for determining a symbol-level bitmap that indicates resources within one or more symbols of the second TDD configuration that are configured for uplink transmissions and that overlap with one or more downlink symbols or flexible symbols of the first TDD configuration. In some examples of the method, apparatuses, and non-transitory computer-readable medium described herein, the symbol-level bitmap indicates one or more resource blocks (RBs) within one or more symbols of the second TDD configuration that are configured for uplink transmissions and that overlap with downlink symbol RBs or flexible symbol RBs of the first TDD configuration. In some examples of the method, apparatuses, and non-transitory computer-readable medium described herein, the symbol-level bitmap may be based on a reference subcarrier spacing (SCS) that is different than a SCS of one or more of the first base station or the second base station.

In some examples, the first UE may be a victim UE, and the method, apparatuses, and non-transitory computer-readable medium described herein may further include operations, features, means, or instructions for transmitting a CLI configuration to the first UE, where the CLI configuration may be based on the common resource pool configuration and indicates wireless resources on which CLI are to be measured, receiving a CLI measurement report from the first UE that indicates the CLI measurements, and providing the CLI measurement report to the second base station.

In some examples of the method, apparatuses, and non-transitory computer-readable medium described herein, the first UE may be configured with the common resource pool configuration, and the transmitting the CLI configuration to the first UE may include operations, features, means, or instructions for transmitting a symbol-level bitmap to the first UE that indicates wireless resources of the common resource pool configuration for which the first UE is to measure a received SRS, and transmitting one or more parameters to the first UE for measuring CLI, where the one or more parameters include a SRS base sequence when the CLI measurement is based on a SRS transmitted by the second UE. In some examples of the method, apparatuses, and non-transitory computer-readable medium described herein, the common resource pool configuration may be partitioned into multiple resources each with the same size of time-frequency resource allocations.

A method of wireless communication at first UE is described. The method may include identifying one or more resource sets for measuring CLI from one or more other UEs, where each resource set includes one or more parameter measurements that are to be reported by the first UE, measuring, for each resource set, one or more reference signals received at the first UE from the one or more other UEs, determining, based on the measuring, the one or more parameter measurements for each resource set, and transmitting a CLI report to a base station that includes the one or more parameter measurements for each resource set.

An apparatus for wireless communication at first UE is described. The apparatus may include a processor, memory in electronic communication with the processor, and instructions stored in the memory. The instructions may be executable by the processor to cause the apparatus to identify one or more resource sets for measuring CLI from one or more other UEs, where each resource set includes one or more parameter measurements that are to be reported by the first UE, measure, for each resource set, one or more reference signals received at the first UE from the one or more other UEs, determine, based on the measuring, the one or more parameter measurements for each resource set, and transmit a CLI report to a base station that includes the one or more parameter measurements for each resource set.

Another apparatus for wireless communication at first UE is described. The apparatus may include means for identifying one or more resource sets for measuring CLI from one or more other UEs, where each resource set includes one or more parameter measurements that are to be reported by the first UE, measuring, for each resource set, one or more reference signals received at the first UE from the one or more other UEs, determining, based on the measuring, the one or more parameter measurements for each resource set, and transmitting a CLI report to a base station that includes the one or more parameter measurements for each resource set.

A non-transitory computer-readable medium storing code for wireless communication at first UE is described. The code may include instructions executable by a processor to identify one or more resource sets for measuring CLI from one or more other UEs, where each resource set includes one or more parameter measurements that are to be reported by the first UE, measure, for each resource set, one or more reference signals received at the first UE from the one or more other UEs, determine, based on the measuring, the one or more parameter measurements for each resource set, and transmit a CLI report to a base station that includes the one or more parameter measurements for each resource set.

In some examples of the method, apparatuses, and non-transitory computer-readable medium described herein, the one or more parameter measurements include one or more of a reference signal received power (RSRP) measurement, a reference signal strength indicator (RSSI) measurement, or combinations thereof, to be reported based on a signal received at the first UE from the one or more other UEs. In some examples of the method, apparatuses, and non-transitory computer-readable medium described herein, the signal received at the first UE from the one or more other UEs may be a SRS or an uplink transmission signal transmitted by the one or more other UEs.

In some examples of the method, apparatuses, and non-transitory computer-readable medium described herein, the identifying the one or more resource sets further may include operations, features, means, or instructions for identifying a number of parameter measurements to be reported for each resource set and, for each parameter measurement, an associated resource index (RI) within the corresponding resource set that is to be reported with each parameter measurement. In some examples of the method, apparatuses, and non-transitory computer-readable medium described herein, the one or more resource sets and the number of parameter measurements to be reported for each resource set may be received in configuration signaling from a base station. In some examples of the method, apparatuses, and non-transitory computer-readable medium described herein, the first UE may be a victim UE and the one or more resource sets may be each associated with an aggressor UE.

In some examples of the method, apparatuses, and non-transitory computer-readable medium described herein, the identifying the one or more resource sets further may include operations, features, means, or instructions for receiving, from a serving base station, a bitmap indicating resource sets from a common resource pool configuration, where each resource set may be associated with a bit in the bitmap.

A method of wireless communication at a first base station is described. The method may include identifying, for a first UE that is served by the first base station, one or more resource sets for measurement of CLI of one or more other UEs at the first UE, where each resource set includes one or more parameter measurements that are to be reported by the first UE, transmitting an indication to the first UE of the identified one or more resource sets, and receiving, from the first UE, a CLI report that includes the one or more parameter measurements of the first UE for each resource set.

An apparatus for wireless communication at a first base station is described. The apparatus may include a processor, memory in electronic communication with the processor, and instructions stored in the memory. The instructions may be executable by the processor to cause the apparatus to identify, for a first UE that is served by the first base station, one or more resource sets for measurement of CLI of one or more other UEs at the first UE, where each resource set includes one or more parameter measurements that are to be reported by the first UE, transmit an indication to the first UE of the identified one or more resource sets, and receive, from the first UE, a CLI report that includes the one or more parameter measurements of the first UE for each resource set.

Another apparatus for wireless communication at a first base station is described. The apparatus may include means for identifying, for a first UE that is served by the first base station, one or more resource sets for measurement of CLI of one or more other UEs at the first UE, where each resource set includes one or more parameter measurements that are to be reported by the first UE, transmitting an indication to the first UE of the identified one or more resource sets, and receiving, from the first UE, a CLI report that includes the one or more parameter measurements of the first UE for each resource set.

A non-transitory computer-readable medium storing code for wireless communication at a first base station is described. The code may include instructions executable by a processor to identify, for a first UE that is served by the first base station, one or more resource sets for measurement of CLI of one or more other UEs at the first UE, where each resource set includes one or more parameter measurements that are to be reported by the first UE, transmit an indication to the first UE of the identified one or more resource sets, and receive, from the first UE, a CLI report that includes the one or more parameter measurements of the first UE for each resource set.

In some examples of the method, apparatuses, and non-transitory computer-readable medium described herein, the one or more parameter measurements include one or more of a RSRP measurement, a RSSI measurement, or combinations thereof, that may be based on a signal received at the first UE from the one or more other UEs. In some examples of the method, apparatuses, and non-transitory computer-readable medium described herein, the signal received at the first UE from the one or more other UEs may be a SRS or an uplink transmission signal transmitted by the one or more other UEs.

In some examples of the method, apparatuses, and non-transitory computer-readable medium described herein, the identifying the one or more resource sets further may include operations, features, means, or instructions for identifying a number of parameter measurements to be reported for each resource set and, for each parameter measurement, an associated RI within the corresponding resource set that may be to be reported with each parameter measurement. In some examples of the method, apparatuses, and non-transitory computer-readable medium described herein, the transmitting may include operations, features, means, or instructions for transmitting configuration signaling to the first UE that indicates the one or more resource sets and the number of parameter measurements to be reported for each resource set.

Some examples of the method, apparatuses, and non-transitory computer-readable medium described herein may further include operations, features, means, or instructions for configuring the first UE with a common resource pool configuration that includes a set of resource sets for measurement of CLI, where the transmitting the indication includes transmitting a bitmap indicating the one or more resource sets from the common resource pool configuration, and where each resource set may be associated with a bit in the bitmap.

A method of wireless communication at UE is described. The method may include receiving an indication from a base station to transmit one or more SRSs for CLI measurement using one or more resource sets, applying one or more transmission parameters to the one or more SRSs to be transmitted using the one or more resource sets, where the one or more transmission parameters are determined based on a most recent uplink transmission to the base station using the corresponding resource set, and transmitting the one or more SRSs based on the applying.

An apparatus for wireless communication at UE is described. The apparatus may include a processor, memory in electronic communication with the processor, and instructions stored in the memory. The instructions may be executable by the processor to cause the apparatus to receive an indication from a base station to transmit one or more SRSs for CLI measurement using one or more resource sets, apply one or more transmission parameters to the one or more SRSs to be transmitted using the one or more resource sets, where the one or more transmission parameters are determined based on a most recent uplink transmission to the base station using the corresponding resource set, and transmit the one or more SRSs based on the applying.

Another apparatus for wireless communication at UE is described. The apparatus may include means for receiving an indication from a base station to transmit one or more SRSs for CLI measurement using one or more resource sets, applying one or more transmission parameters to the one or more SRSs to be transmitted using the one or more resource sets, where the one or more transmission parameters are determined based on a most recent uplink transmission to the base station using the corresponding resource set, and transmitting the one or more SRSs based on the applying.

A non-transitory computer-readable medium storing code for wireless communication at UE is described. The code may include instructions executable by a processor to receive an indication from a base station to transmit one or more SRSs for CLI measurement using one or more resource sets, apply one or more transmission parameters to the one or more SRSs to be transmitted using the one or more resource sets, where the one or more transmission parameters are determined based on a most recent uplink transmission to the base station using the corresponding resource set, and transmit the one or more SRSs based on the applying.

In some examples of the method, apparatuses, and non-transitory computer-readable medium described herein, the one or more transmission parameters include one or more of a transmission precoding parameter, a number of antenna ports, or any combinations thereof. In some examples of the method, apparatuses, and non-transitory computer-readable medium described herein, the one or more transmission parameters include a transmission precoding parameter that may be based on a transmitted precoding matrix indicator (TPMI) received from the base station in a most recent uplink grant for a codebook-based uplink shared channel transmission. In some examples of the method, apparatuses, and non-transitory computer-readable medium described herein, the one or more transmission parameters include a transmission precoding parameter that may be based on a SRS resource indicator (SRI) received from the base station in a most recent uplink grant for a non-codebook-based uplink shared channel transmission.

In some examples of the method, apparatuses, and non-transitory computer-readable medium described herein, the applying one or more transmission parameters may include operations, features, means, or instructions for identifying a first resource set of the one or more resource sets that corresponds to resources used in a prior uplink control channel transmission and a second resource set of the one or more resource sets that corresponds to resources used in a prior uplink shared channel transmission, applying a same transmission scheme and uplink power control as the prior uplink control channel transmission to generate a non-precoded single port SRS transmission via the first resource set, and applying a transmission precoding, number of antenna ports, and transmission power that is aligned with the prior uplink shared channel transmission to generate a precoded multi-port SRS transmission via the second resource set, where the first resource set and the second resource set occupy different symbols within a slot.

BRIEF DESCRIPTION OF THE DRAWINGS

FIGS. 16 through 22 show flowcharts illustrating methods that support measurement and reporting for UE-to-UE cross-link interference in accordance with aspects of the present disclosure.

DETAILED DESCRIPTION

Figure 1:
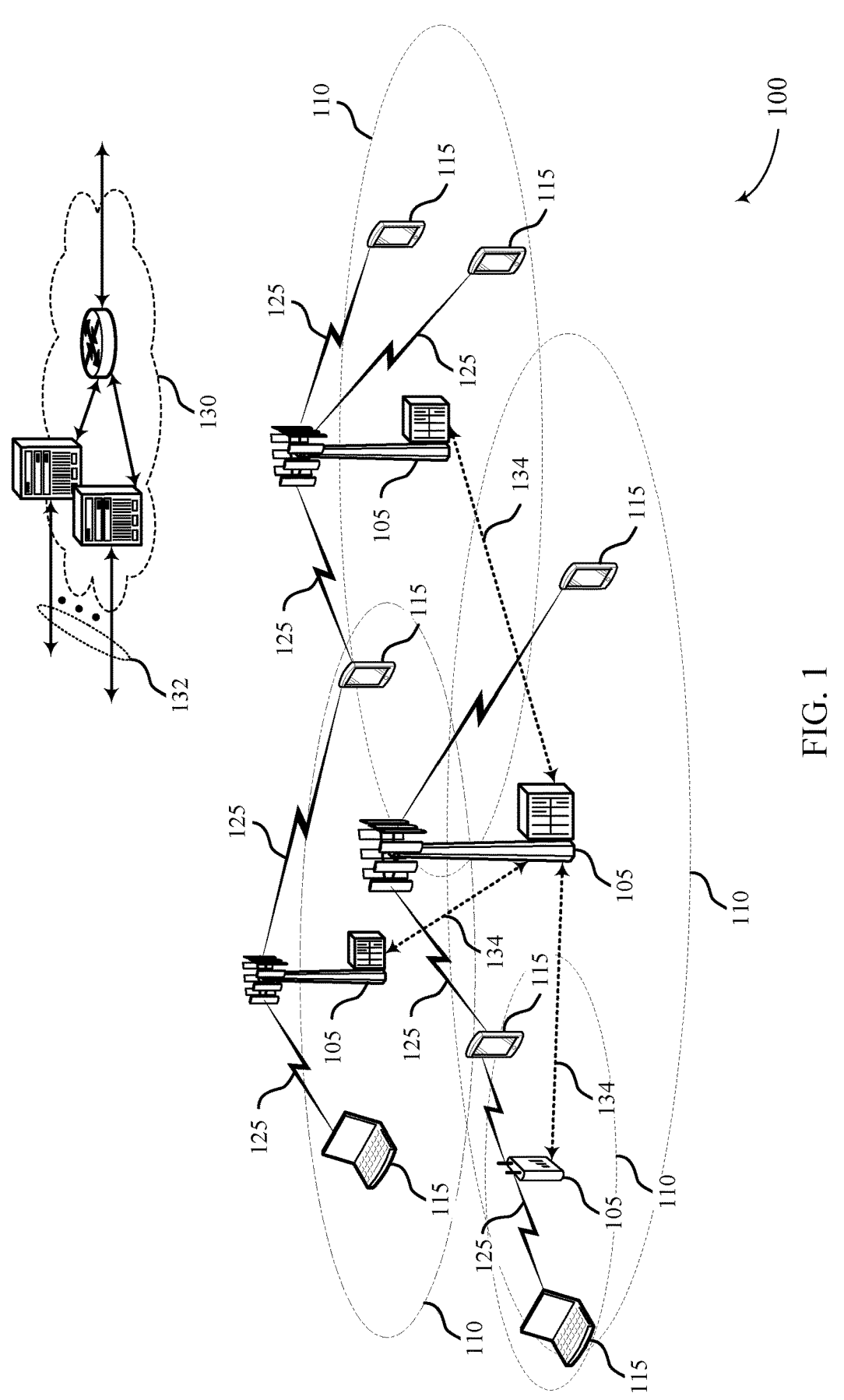
FIG. 1 illustrates an example of a system for wireless communications that supports measurement and reporting for user equipment (UE)-to-UE cross-link interference in accordance with aspects of the present disclosure.

Various aspects of the present disclosure provide techniques that support measurement and reporting for user equipment (UE) cross-link interference (CLI). Various described techniques provide for identification of wireless resources for which CLI is to be measured, provide for common configuration for CLI measurements, provide for efficient reporting of CLI measurements, and provide for accurate representation of CLI based on measurements at a victim UE. In some cases, a common resource pool may be configured in which CLI measurements for resources within the resource pool have a common configuration (e.g., transmission bandwidth, transmission duration, periodicity and slot offset of the resource pool, a sounding reference base sequence, and the like). When providing information indicating resources that are to be measured for CLI, a bitmap that indicates resources within the common resource pool may be provided with CLI measurement configurations corresponding to the common resource pool configuration.

Such a bitmap may be communicated via backhaul connections between neighboring base stations when initiating a CLI measurement, and in some cases may be communicated to a UE to indicate CLI measurements that are to be performed.

As discussed herein, CLI may be present in a wireless communications system that employs time division duplexing (TDD) for wireless communications, for example, where a same wireless channel is used for both uplink transmissions and downlink transmissions. In a TDD system with macro cells which provide a wide coverage area, the macro cells may often use the same TDD uplink/downlink configuration. For example, multiple macro cells may use the same slot format, which may provide, on average, the largest throughput for the large number of users connected to the macro cells. For small cells (e.g., with a cell radius of a few hundred meters), TDD uplink/downlink configurations may dynamically change to follow a change of traffic. For example, if the traffic in a small cell shifts toward being more uplink-heavy, the TDD configuration of the small cell may be modified to using slots which have a larger number of uplink symbol periods. The TDD configuration of the small cell may be dynamically indicated to UEs in the small cell by, for example, a slot format indicator (SFI) in downlink control information. Additionally, or alternatively, the TDD configuration of the small cell may be semi-statically configured by higher layer signaling, such as radio resource control (RRC) signaling.

In some cases, neighboring cells may use different TDD configurations, which can lead to conflicting symbol periods and CLI. For example, a symbol period configured for downlink in a first cell may be configured for uplink in a second cell. If a first UE in a first cell is configured for uplink transmission during a symbol period, a second UE in a second cell is configured to receive a downlink transmission during the symbol period, and the first UE and the second UE are in close proximity, the uplink transmission of the first UE may result in interference in reception of the downlink transmission at the second UE. This type of interference may be referred to CLI. In some cases, differing TDD configurations of adjacent cells may result in UE-to-UE CLI when an uplink symbol of one cell collides with a downlink symbol of an adjacent cell. For example, CLI may occur near or between cell edge UEs of nearby cells, where a UE that receives interference (e.g., interference with a downlink reception in a downlink symbol) may be referred to as a victim UE and a UE that causes interference (e.g., a nearby UE that transmits during the victim UE downlink symbol) may be referred to as an aggressor UE.

To manage CLI in the wireless communications system, a victim UE may measure signal characteristics of an aggressor UE. In some cases, an aggressor UE may transmit uplink transmissions (e.g., PUSCH or PUCCH transmissions) that may be measured at a victim UE and reported to a serving base station of the victim UE. In some cases, the aggressor UE may be configured to transmit a reference signal (e.g., a sounding reference signal (SRS)) during the one or more symbol periods. The victim UE may be configured to receive and measure the reference signal during the one or more symbol periods. The victim UE, based on the measured CLI, may provide a measurement report to the serving base station of the victim UE to assist the network in determining a tolerance or mitigation action for the UE-to-UE CLI. In an example, a first TDD configuration for a first cell associated with the aggressor UE may include one or more uplink symbol periods which, based on scheduling associated with the first TDD configuration, may collide with one or more downlink symbol periods of a second TDD configuration for a second cell associated with the victim UE. A first base station providing the first cell may configure the aggressor UE to transmit a reference signal, such as an SRS, during the uplink symbol periods of a slot which may cause CLI (e.g., based on a schedule associated with the uplink symbol periods). A second base station providing the second cell may configure the victim UE to receive the reference signal during the corresponding downlink symbol periods of the slot. In some cases, the UE may transmit the CLI reference signal in the interfering symbols of the uplink/downlink.

When configuring resources for CLI measurements, various different parameters may be used to perform the CLI measurements, such as a transmission bandwidth, a transmission duration, a periodicity and slot offset, or combinations thereof. Further, in cases where the aggressor UE transmits a SRS for CLI measurement, a SRS base sequence may be configured. In some cases, a common resource pool configuration may be provided in which CLI measurements for resources within the resource pool have a common configuration. When providing information indicating resources that are to be measured for CLI, a bitmap that indicates resources within the common resource pool may be provided. For example, neighboring base stations may configure a common resource pool and, in cases where CLI measurements between UEs are to be obtained, the base stations may exchange the bitmap, with or without exchanging the different parameters associated with the CLI measurement. Such techniques may provide more efficient usage of backhaul resources between base stations. Further, in some cases, UEs may also be configured with the common resource pool configurations, and a base station may provide a UE with the bitmap to identify CLI resources and parameters, which may provide more efficient usage of wireless resources compared to providing the UE with each separate CLI resource and associated parameter for CLI measurement.

In some cases, one or more resource sets for measuring CLI may be configured, where each resource set may include one or more parameter measurements that are to be reported by a UE. In some cases, the one or more parameter measurements may include measurements of a reference signal (e.g., a sounding reference signal (SRS)) that is transmitted by an aggressor UE, measurements of an uplink data transmission (e.g., physical uplink shared channel (PUSCH) or physical uplink control channel (PUCCH) transmissions) of the aggressor UE, or combinations thereof. In some cases, the measurements may be made by a victim UE and reported to a serving base station using a layer-one (L1) reference signal received power (RSRP) parameter of a channel state information (CSI) reporting mechanism.

In some cases, an aggressor UE may be configured to transmit a SRS in one or more symbols that may be measured for CLI at a victim UE. In such cases, in order to provide an accurate representation of CLI that would be present for a non-SRS PUSCH or PUCCH transmission, the aggressor UE may apply one or more transmission parameters to the SRS transmission that are determined based on a most recent uplink transmission to the base station using the corresponding resource (e.g., precoding used in a prior PUSCH transmission of a symbol may be applied to the SRS transmission during the corresponding symbol).

Particular aspects of the subject matter described in this disclosure may be implemented to realize one or more of the following potential advantages, among others. The techniques employed by the devices may provide benefits and enhancements to the operation of the devices. For example, operations performed by the devices may provide improvements to reducing UE-to-UE interference (e.g., CLI). In some examples, identifying and configuring one or more resource sets for measuring CLI (e.g., by modifying TDD configurations based on, for example, performance degradation), among other examples related to wireless communications, may support improvements to reducing power consumption (e.g., through less aggressive TDD configurations) and increasing transmission throughput (e.g., through more aggressive TDD configurations), and increasing spatial reuse, among other advantages.

Aspects of the disclosure are initially described in the context of a wireless communications system. Aspects of the disclosure are further illustrated by and described with reference to apparatus diagrams, system diagrams, and flowcharts that relate to measurement and reporting for UE-to-UE cross-link interference.

FIG. 1 illustrates an example of a wireless communications system 100 that supports measurement and reporting for UE-to-UE cross-link interference in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

In some cases, the wireless communications system 100 may use TDD communications, where each base station 105 providing a cell may use a different TDD configuration. In some cases, neighboring cells using different TDD formats can lead to conflicting transmission directions in one or more symbol periods. For example, a symbol period of a first cell may be configured for downlink, where the same symbol period is configured for uplink in a second, neighboring cell. If the first UE 115 and the second UE 115 are in close proximity, the uplink transmission of the first UE 115 may cause interference to reception of the downlink transmission at the second UE 115, which may be referred to CLI. Various techniques discussed herein provide for efficient configuration and measurement techniques for measuring and reporting CLI.

Figure 2:
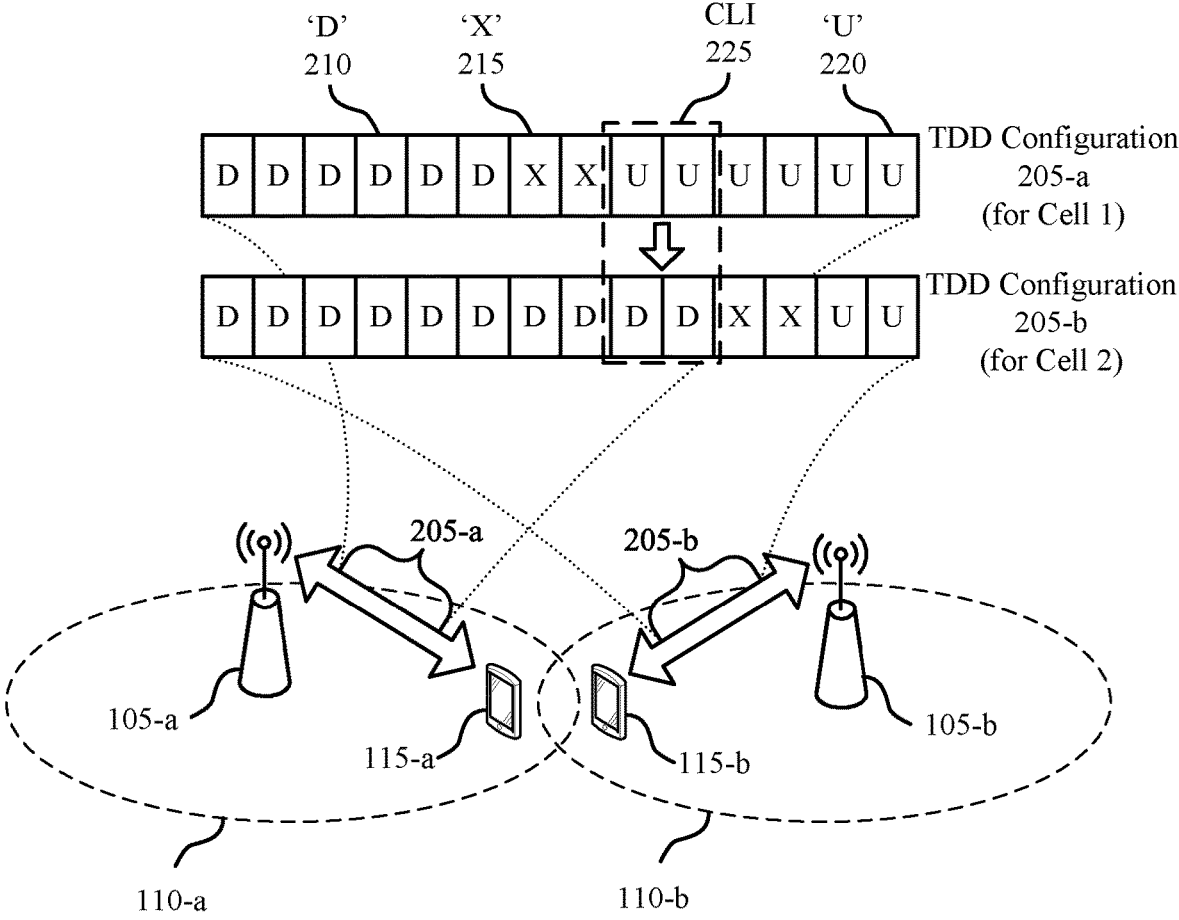
FIG. 2 illustrates an example of a portion of a wireless communications system that supports measurement and reporting for UE-to-UE cross-link interference in accordance with aspects of the present disclosure.

FIG. 2 illustrates an example of a wireless communications system 200 that supports measurement and reporting for UE-to-UE cross-link interference in accordance with aspects of the present disclosure. In some examples, wireless communications system 200 may implement aspects of wireless communications system 100. The wireless communications system 200 may include UE 115-a and UE 115-b, which may each be an example of a UE 115 as described herein. The wireless communications system 200 may include base station 105-*a* and base station 105-*b*, which may each be an example of a base station 105 as described herein. The base stations 105 may each be associated with a cell which provides wireless communications with the base station 105 within a coverage area 110, with base station 105-*a* having coverage area 110-*a* and serving UE 115-*a*, and base station 105-*b* having coverage area 110-*b* and serving UE 115-*b*.

The wireless communications system 200 may employ TDD communications, where a wireless communications channel is used for both uplink transmissions and downlink transmissions. Each cell may configure a TDD configuration 205 for the cell. For example, the first cell of base station 105-*a* may use a first TDD configuration 205-*a*, and the second cell of base station 105-*b* may use a second TDD configuration 205-*b*. UEs 115 in these cells may communicate with the base station 105 based on the corresponding TDD configuration 205 for the cell. For example, a slot of a TDD configuration 205 may include symbol periods for downlink symbols 210, flexible symbols 215, or uplink symbols 220, or any combination thereof. The base station 105 may transmit a downlink transmission in a downlink symbol 210, and the UE 115 may transmit an uplink transmission in an uplink symbol 220. Flexible symbols 215 may, in some cases, be dynamically configured for either uplink or downlink, or may be configured as guard periods (e.g., unused periods) between the uplink transmissions and downlink transmissions. A guard period may prevent inter-symbol interference or may provide time for a UE 115 to adjust radio frequency hardware.

The base stations 105 may dynamically change the TDD configurations 205. In an example, the traffic in the first cell may shift toward being more uplink-heavy, and the first TDD configuration 205-*a* of the first cell may be modified (e.g., by a base station 105) to using a slot configuration which includes a larger number of uplink symbol periods. In some cases, a TDD configuration 205 may be dynamically indicated to UEs in the cell by a slot format indicator (SFI) provided in downlink control information (DCI) to a UE 115. The DCI conveying the SFI may be transmitted in one of the first few downlink symbols 210 of a slot, and may convey TDD configuration 205 for one or more additional slots. That is, for the example slot illustrated in FIG. 2, the SFI including the TDD configuration 205 may be received in the slot, or in a previous slot. Additionally or alternatively, the TDD configuration 205 may be semi-statically configured (e.g., included in a radio resource control (RRC) configuration) by higher layer signaling, such as RRC signaling.

In some cases, different TDD configurations 205 used by neighboring cells may lead to conflicting transmission directions for some symbol periods of a slot. For example, the 9th and 10th symbol periods of the slot illustrated in FIG. 2 may have conflicting transmission directions for the first TDD configuration 205-*a* and the second TDD configuration 205-*b*. In the example illustrated in FIG. 2, TDD configuration 205-*a* includes uplink symbols 220 in symbol periods where TDD configuration 205-*b* includes downlink symbols 210. Based on the TDD configuration 205-*a* and the second TDD configuration 205-*b*, UE 115-*a* in the first cell may be configured to transmit an uplink transmission during periods where UE 115-*b* in the second cell is configured to receive a downlink transmission. The first cell and the second cell may be neighboring cells, and UE 115-*b* and UE 115-*a* may be near each other at the edges of their respective cells. In some cases, the uplink transmission of UE 115-*a* may cause interference to reception of the downlink transmission at UE 115-*b*. This type of interference may be referred to as UE-to-UE CLI, shown by CLI 225 at the conflicting symbol periods. Differing TDD configurations 205 may result in CLI 225 (e.g., UE-to-UE CLI) when an uplink symbol of one cell collides with a downlink symbol of another nearby cell. CLI 225 may occur near or between cell edge UEs of nearby cells (e.g., between UEs located at edges of nearby cells). The UE 115 transmitting the uplink signal (e.g., UE 115-*a* in the example of FIG. 2) may be referred to as the aggressor UE 115, and the UE 115 which is receiving the affected downlink transmission (e.g., UE 115-*b* in the example of FIG. 2) may be referred to as the victim UE 115. In some cases, the CLI 225 may occur between one or more aggressor UEs 115 and one or more victim UEs 115.

To manage the CLI 225 in the wireless communications system 200, victim UE 115 (e.g., UE 115-*b*) may measure signals of the aggressor UE 115 (e.g., UE 115-*a*). In some cases, the aggressor UE 115 (e.g., UE 115-*a*) may transmit a reference signal during one or more symbol periods in which CLI 225 may occur. The victim UE 115 (e.g., UE 115-*b*) may be configured to receive and measure the reference signal during those symbol periods. The reference signal may be, for example, an SRS. In this example, UE 115-*a* may transmit an SRS in the 9th and 10th symbol periods of the slot (e.g., corresponding to uplink symbols 220), which, as scheduled, may cause the CLI 225. UE 115-*b* may receive the SRS (e.g., in the corresponding downlink symbols 210) and perform a measurement procedure. In other cases, the aggressor UE 115 (e.g., UE 115-*a*) may transmit uplink communications (e.g., PUSCH or PUCCH transmissions), and the victim UE 115 (e.g., UE 115-*b*) may measure received signals of the uplink communications.

The UE 115-*b* may transmit a measurement report to base station 105-*b* including the CLI measurements. The configurations for transmitting signals for CLI measurement at the aggressor UE 115 (e.g., UE 115-*a*) and receiving and measuring the CLI at the victim UE 115 (e.g., UE 115-*b*) may be determined and configured at the corresponding serving cells for the aggressor UEs 115 and victim UEs 115. For example, base station 105-*a* may transmit a first configuration to UE 115-*a*, and UE 115-*a* may transmit signals (e.g., SRS or uplink communications) based on the configuration. Base station 105-*b* may transmit a second configuration to UE 115-*b*, and UE 115-*b* may monitor for, receive, and measure the CLI based on the second configuration.

The network may use the measurement report to determine whether the UE-to-UE CLI (e.g., CLI 225) is causing too much performance degradation at UE 115-*b* or whether UE 115-*b* can handle more interference (e.g., whether the performance degradation at UE 115-*b* due to CLI 225 is above or below a threshold or tolerance). In some cases, the network may determine that UE 115-*b* can handle more interference from the CLI 225 and implement more aggressive TDD configurations 205 for one or both of the cells (e.g., the first and second cells associated with UE 115-*a* and 115-*b*). The more aggressive TDD configurations 205 may introduce an increase in overlapping symbols and increased instances or durations of CLI 225, but possibly result in higher throughput. In some cases, the network may determine that the interference from the CLI 225 affects the downlink reception at UE 115-*b* too much (e.g., performance degradation at UE 115-*b* due to CLI 225 is above a threshold or tolerance), and the network may implement less aggressive TDD configurations 205 for one or both of the cells. The less aggressive TDD configurations 205 may reduce the number of overlapping symbols and reduce the UE-to-UE CLI (e.g., CLI 225), provide for reduced transmission power, or combinations thereof, which may improve channel conditions for the victim UE 115 (e.g., UE 115-*b*). In some examples, the determinations may be based on a threshold or a tolerance. For example, if the channel quality, reference signal received power (RSRP) (i.e., a received reference signal (RS) power of a configured RS resource), reference signal strength indicator (RSSI) (e.g., the total received power measured in certain OFDM symbols), or another measurement metric, at the victim UE 115 (e.g., UE 115-*b*) is below a threshold, the serving cell of the victim UE 115 (e.g., UE 115-*b*) may implement a less aggressive TDD configuration 205. In some cases, one or more of the base stations 105 may determine whether to use a more aggressive or less aggressive TDD configuration 205. Additionally, or alternatively, a control unit (CU), a gNB, or some other entity may determine the one or more TDD configurations 205 based on the measurements.

In some cases, either the victim UE 115 or the aggressor UE 115 may measure the CLI strength. For example, UE 115-*b*, as the victim, may measure signals transmitted by UE 115-*a*, the aggressor. Additionally, or alternatively, UE 115-*a* may measure signals transmitted by UE 115-*b*. Based on channel reciprocity of the TDD channel, the measurement performed by UE 115-*a* may also reflect aggressor-to-victim interference strength. In cases where CLI measurements are based on SRS, measurement and reporting may be based on SRS at different levels. For example, measurement and reporting may be cell-specific in which all UEs in a cell transmit the same SRS, group-specific in which a subset of UEs in the cell transmit the same SRS, or UE-specific in which each UE in the cell transmits a distinctive SRS (e.g., an SRS associated with the UE). In cases where measurement and reporting is based on other uplink traffic (e.g., PUSCH and PUCCH transmissions), a UE 115 may measure and report a power level in the configured CLI resource.

For example, for SRS-based CLI measurements, the UE 115-*b* in the victim cell may observe strong interference (e.g., interference above a threshold) and report it (CLI) to the base station 105-*b*. The system may trigger the CLI measurement among cells, and a potential aggressor UE 115 (e.g., UE 115-*a*) may transmit SRS in two symbols of a slot. The victim UE 115 (e.g., UE 115-*b*) may measure the SRS in the configured resource in a downlink reception, and provide a CLI report including measured parameters, such as RSRP, RSSI, one or more other parameters (e.g., signal to noise ratio (SNR), or combinations thereof. In other examples that include performing measurements and reporting based on other uplink traffic (e.g., PUSCH and PUCCH transmissions), the aggressor UE 115 (e.g., UE 115-*a*) may send a transmission using scheduled resources, and victim UE 115 (e.g., UE 115-*b*) may estimate the downlink reception at configured CLI resources and provide a CLI measurement report to base station 105-*b*.

According to various aspects of the present disclosure, configuration for CLI measurement may be exchanged over backhaul communications among base stations 105. For example, the base station 105-*b* of the victim cell may receive the configurations for CLI measurement (e.g., TDD configurations) from neighboring base station 105-*a* of the aggressor cell. The base station 105-*b* may configure the victim UE 115 (e.g., UE 115-*b*) for CLI measurements based on the CLI configurations, and the victim UE 115 (e.g., UE 115-*b*) may measure received signals in the configured CLI resources according to the CLI configuration and report the measured parameters (e.g., RSRP, RSSI, etc.). The base station 105-*b* may provide the received CLI measurement report to the base station 105-*a*, which may derive the aggressor UE 115 (e.g., UE 115-*a*) from the CLI measurement report and apply interference mitigation to manage CLI based on the CLI measurement report.

In some cases, the base stations 105 may identify a common resource pool in which common CLI configurations are provided for resources within the resource pool, with or without exchanging complete CLI configuration parameters for each instance that CLI is to be measured. In some aspects, the base stations 105 may exchange a reduced amount of information, such as a bitmap, that identifies the resources on which CLI measurements are to be performed. Based on the common resource pool, parameters for the CLI measurements (e.g., transmission bandwidth, transmission duration, time-frequency resource, cyclic shift, periodicity of CLI measurements, slot offset of the resource pool, frequency hopping pattern, reference signal base sequence, or any combinations thereof) may be determined. In some cases, each resource of the resource pool may have a one-to-one mapping to an aggressor UE or a group of UEs.

The base stations 105 may exchange an indication of the CLI resource, such as by using a bitmap (e.g., a symbol-level bitmap, RB-level bitmap, or combinations thereof), which may be used to determine CLI measurement configuration. Such a technique may enhance backhaul communications efficiency between base stations. Further, in some cases, one or more UEs 115 may be configured with the common resource pool, and a similar bitmap may be provided to the UE 115 to identify CLI measurement resources and measurement parameters. In some cases, when reporting CLI measurement information, the victim UE 115 (e.g., UE 115-*b*) may report one or more measured parameters (e.g., RSRP, RSSI, etc.) using a same configuration as used to transmit a CSI report (e.g., RSRP/RSSI may be reported as a layer-one (L1) RSRP parameter in a CSI report). Such a technique may provide for efficient reporting of CLI measurements.

Additionally or alternatively, the aggressor UE 115 (e.g., UE 115-*a*) may be configured to transmit a SRS in one or more symbols that may be (e.g., are to be) measured for CLI at victim UE 115 (e.g., UE 115-*b*). In such cases, in order to provide an accurate representation of CLI that would be present for a non-SRS PUSCH or PUCCH transmission, the aggressor UE 115 (e.g., UE 115-*a*) may apply one or more transmission parameters to the SRS transmission. The transmission parameters may include parameters that are determined based on a most recent uplink transmission to the base station 105-*a* using the corresponding resource (e.g., precoding used in a prior PUSCH transmission of a symbol may be applied to the SRS transmission during the corresponding symbol).

Figure 3:
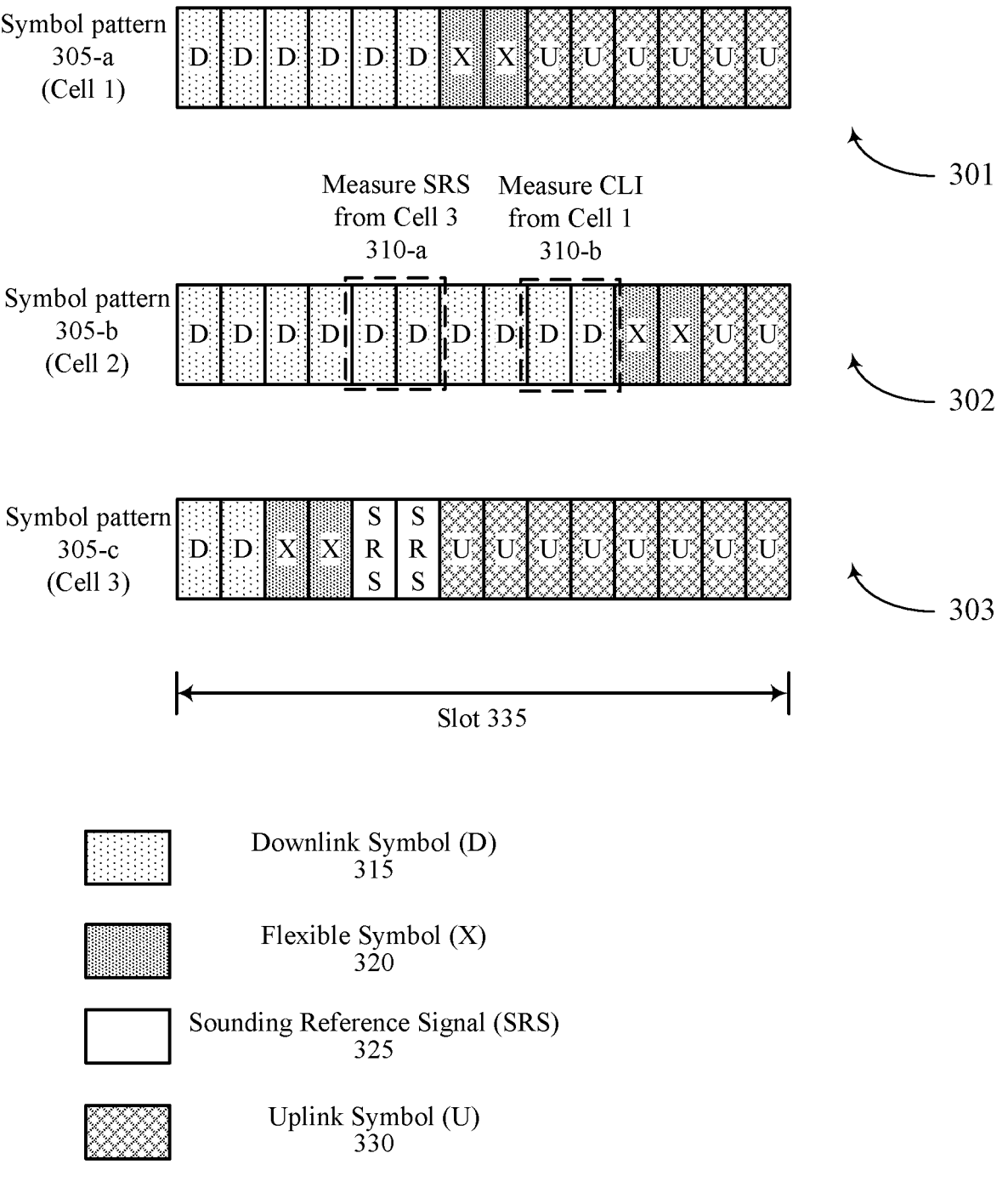
FIG. 3 illustrates an example of TDD configurations of neighboring base stations that support measurement and reporting for UE-to-UE cross-link interference in accordance with aspects of the present disclosure.

FIG. 3 illustrates an example of TDD configurations 300 of neighboring base stations that support measurement and reporting for UE-to-UE cross-link interference in accordance with aspects of the present disclosure. In some examples, TDD configurations 300 may implement aspects of wireless communications system 100. In the example, of FIG. 3, a wireless communications system may employ multiple cells, where each cell is capable of using a different dynamic TDD configuration. A TDD configuration may include a symbol pattern 305 for a slot 335, including symbol periods for downlink symbols 315, flexible symbols 320, uplink symbols 330, or a combination thereof.

A symbol pattern 305 for a TDD configuration for a first cell may be scheduled to cause CLI in at least one other cell. For example, the symbol pattern 305-*c* for the TDD configuration 303 of a cell 3 (e.g., a schedule associated with the symbol pattern 305-*c*) may cause UE-to-UE CLI in cells 1 and 2). Additionally, the symbol pattern 305-*a* for the TDD configuration 301 of cell 1 (e.g., a schedule associated with the symbol pattern 305-*a*) may cause UE-to-UE CLI of cell 2 based on the TDD configuration 302 of cell 2. In some cases, an aggressor UE of cell 3 may be configured to transmit an SRS 325 using a symbol period assigned for the uplink symbols 330 (shown as an SRS 325) which, as scheduled, may cause interference. In other cases, an aggressor UE may transmit uplink transmissions without an SRS, such as illustrated for symbol pattern 305-*a*.

CLI may occur between uplink symbols 330 (e.g., interfering symbols) of one cell that overlap with downlink symbols 315 (e.g., interfered symbols) or flexible symbols 320 of another cell. A victim UE of cell 2, in this example, may measure the SRS 325 from the aggressor UE of cell 3 at downlink symbols 315 included at 310-*a*. Likewise, the victim UE of cell 2, in this example, may measure the uplink transmissions from the aggressor UE of cell 1 at downlink symbols 315 included at 310-*b*. With these techniques, the UEs 115 may use a TDD configuration and symbol pattern 305 configured for dynamic TDD communications as a TDD configuration and symbol pattern 305 for CLI transmission and measurement. In some examples, the aggressor UEs 115 may transmit one or more SRSs 325 in symbols different from those illustrated in FIG. 3. For example, the aggressor UEs 115 may not be subject to a restriction of transmitting the SRS 325 in a restricted set of symbols (e.g., corresponding to a last 6 symbol periods of the slot 335). When configuring resources for CLI measurement and reporting, techniques such as discussed herein may provide for efficient configuration and measurement techniques for measuring and reporting CLI.

Figure 4:
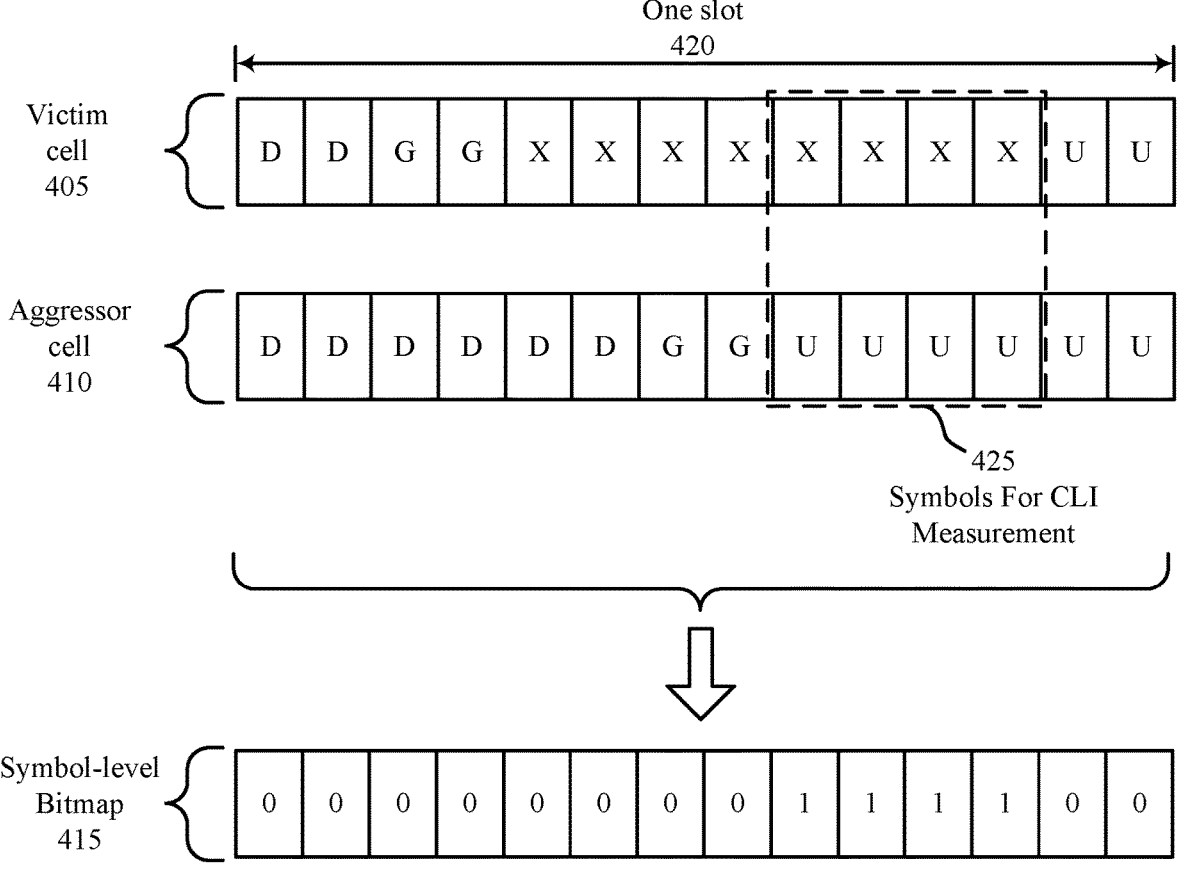
FIG. 4 illustrates an example of a symbol-level bitmap that supports measurement and reporting for UE-to-UE cross-link interference in accordance with aspects of the present disclosure.

FIG. 4 illustrates an example of a symbol-level bitmap 400 that supports measurement and reporting for UE-to-UE cross-link interference in accordance with aspects of the present disclosure. In some examples, symbol-level bitmap 400 may implement aspects of wireless communications system 100 or 200. In this example, a common resource pool may be configured at base stations that serve UEs that may perform procedures for CLI measurements.

In some cases, the common resource pool may contain a mapping between wireless resources (e.g., on a symbol level, a physical resource block (PRB) level, or combinations thereof) and associated CLI parameters (e.g., transmission bandwidth, transmission duration, time-frequency resource, cyclic shift, periodicity of CLI measurements, slot offset of the resource pool, frequency hopping pattern, reference signal base sequence, or any combinations thereof). In some cases, the base stations may exchange information for the resource pool (e.g., TDD configurations) based on identifying that UEs served by the base stations experience CLI. In some cases, the base stations may receive a resource pool configuration from a network entity (e.g., an ANC, a gNB, or another entity in the core network). Additionally, in some cases one or more UEs may also be configured with the common resource pool configuration (e.g., via RRC configuration). The base stations, when exchanging information related to CLI measurements, may provide an indication of the resources that are to be used for CLI measurements, and the configuration of the resources may be determined based on the mapping to the common resource pool.

In the example of FIG. 4, a victim cell 405 may have a first TDD configuration, and an aggressor cell 410 may have a second TDD configuration. In the second TDD configuration, four symbols within slot 420 may have different transmission directions compared to symbols in the first TDD configuration, which may result in CLI. In this example, a symbol-level bitmap 415 may be determined from the first TDD configuration and the second TDD configuration indicating resources 425 within the slot 420 that are configured for uplink transmissions in the second TDD configuration (e.g., of the aggressor cell 410) and that overlap with one or more downlink symbols or flexible symbols of the first TDD configuration (e.g., of the victim cell 405). In some examples, the aggressor cell 410 may configure an aggressor UE to transmit SRS for CLI measurement based on the symbol-level bitmap 415. For example, based on the symbol-level bitmap 415, the aggressor cell 410 may configure the aggressor UE to transmit SRS for symbols semi-statically indicated as downlink symbols or flexible symbols in the victim cell 405 but indicated as uplink symbols in the aggressor cell 410. Likewise, the victim cell 405 may configure a victim UE to measure CLI based on the symbol level bitmap 415. The configuration parameters for the CLI may be determined based on the mapping to the resource pool (e.g., the transmission bandwidth, the transmission duration, a periodicity and slot offset of resource pool, base sequence for SRS transmission when SRS is used, etc.).

In some cases, the symbol-level bitmap 415 may be based on a reference subcarrier spacing (SCS) different from a SCS used in the aggressor cell 410, the victim cell 405, or both. In some cases, the resource pool may be partitioned into multiple resources, each with the same size of time-frequency resource allocation (e.g., same size of time-frequency resource allocation). In some cases, the resource pool may be partitioned based on symbol-level resources and RB-level resources, such as discussed with reference to FIG. 5.

Figure 5:
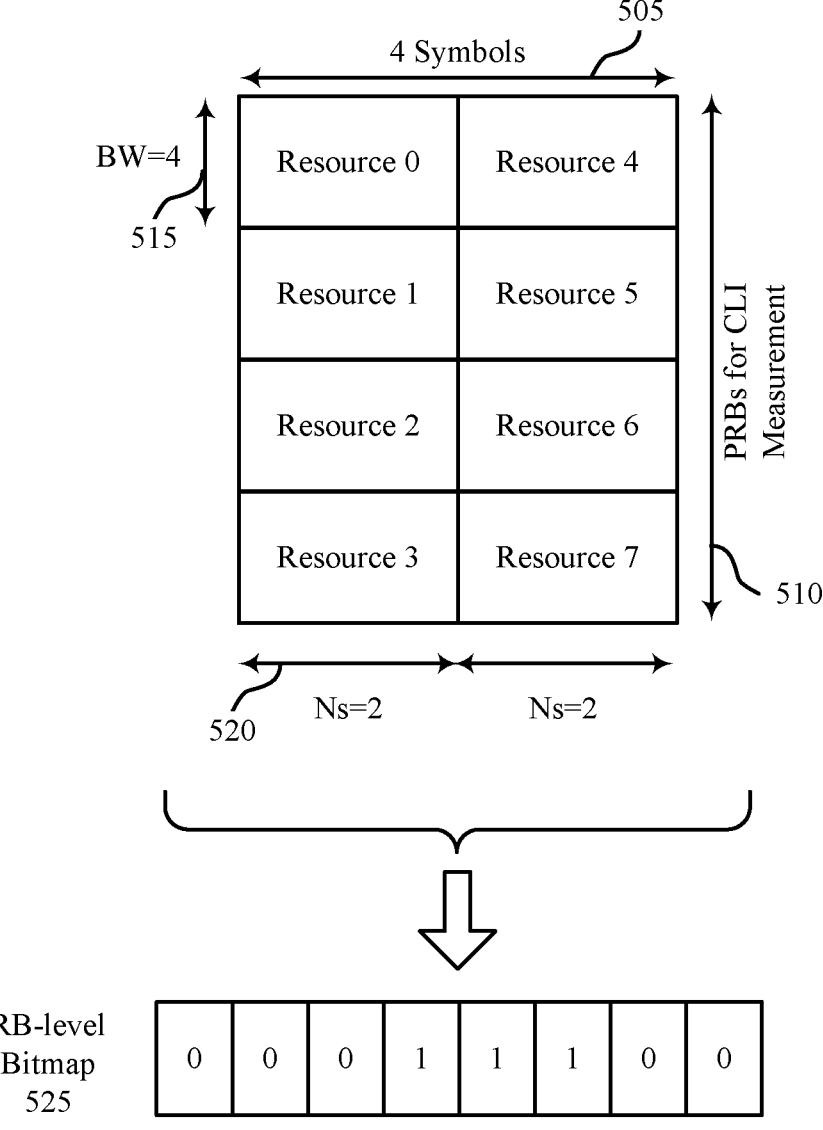
FIG. 5 illustrates an example of a RB-level bitmap that supports measurement and reporting for UE-to-UE cross-link interference in accordance with aspects of the present disclosure.

FIG. 5 illustrates an example of a resource block (RB)-level bitmap 500 that supports measurement and reporting for UE-to-UE cross-link interference in accordance with aspects of the present disclosure. In some examples, RB-level bitmap 500 may implement aspects of wireless communications system 100 or 200. In this example, the common resource pool may be configured at base stations that serve UEs that may perform procedures for CLI measurements at a RB-level.

In the example of FIG. 5, four symbols 505 span a number of PRBs 510, each PRB 510 having a duration 520 of two symbols (e.g., Ns=2). For example, 16 PRBs may be mapped for the four symbols 505. Thus, in the four symbols 505 of FIG. 5, the resource pool may be partitioned into eight resources, labeled resource 0 through resource 7 in FIG. 5. A RB-level bitmap 525 may provide consecutive bits for each of the partitioned resources consecutively. In the example, resource numbers 3 through 5 may each be configured for CLI, as indicated by '1' in the RB-level bitmap 525.

In some cases, base stations may exchange TDD configurations (e.g., RB-level bitmaps) to identify CLI resources and configurations, and may configure served UEs according to the CLI resources and configurations that are mapped to the resource pool. In cases where a victim UE measures CLI, measurements may be made in the configured CLI resources according to the CLI configuration, and may be reported to the serving base station of the victim UE. In some cases, the victim UE may report one or more measurement parameters, such as RSRP, RSSI, or combinations thereof. In some cases, the victim UE may transmit measured parameters as L1-RSRP related quantities using a reporting format that is used for CSI reporting (e.g., a format that corresponds to a CSI report). In some examples, a UE in the victim cell may be configured with resource sets for CLI measurement, where one or more of the resource sets may be associated with an aggressor cell. Each resource set may include one or more resources, each having a different time-frequency resource, and may be configured semi-statically (e.g., via RRC signaling). In some cases, the resource pool configuration may be used to configure the UE with the resource set. The configuration may indicate what the UE is to report (e.g., RSSI, RSRP, RSSI and RSRP, or other parameters).

For each resource set, a reporting setting may be configured which indicates quantities to be reported (e.g., L1-RSRP related quantities). For example, a higher layer parameter nrofReportRS (e.g. 1, 2, 3 or 4) may indicate a number of L1-RSRP measurements to be reported. For each reported L1-RSRP measurement, the associated resource index (RI) within the SRS resource set is also reported. The UE may provide CLI reporting based on the reporting setting, and may feedback RSSI/RSRP with the parameter nrofReportRS, which may indicate the number and the RI (e.g., the number of L1-RSRP measurements and the RIs associated with the L1-RSRP measurements). When reporting the CLI measurements, the UE may measure SRS transmissions of the aggressor UE, or may measure uplink traffic of the aggressor UE. When using SRS transmission measurements, the aggressor UE may apply one or more transmission parameters (e.g., precoding) that correspond to uplink transmissions of the associated slot in the TDD configuration of the aggressor UE, which may provide a representative measurement of actual CLI. An example of such transmissions is discussed with respect to FIG. 6.

Figure 6:
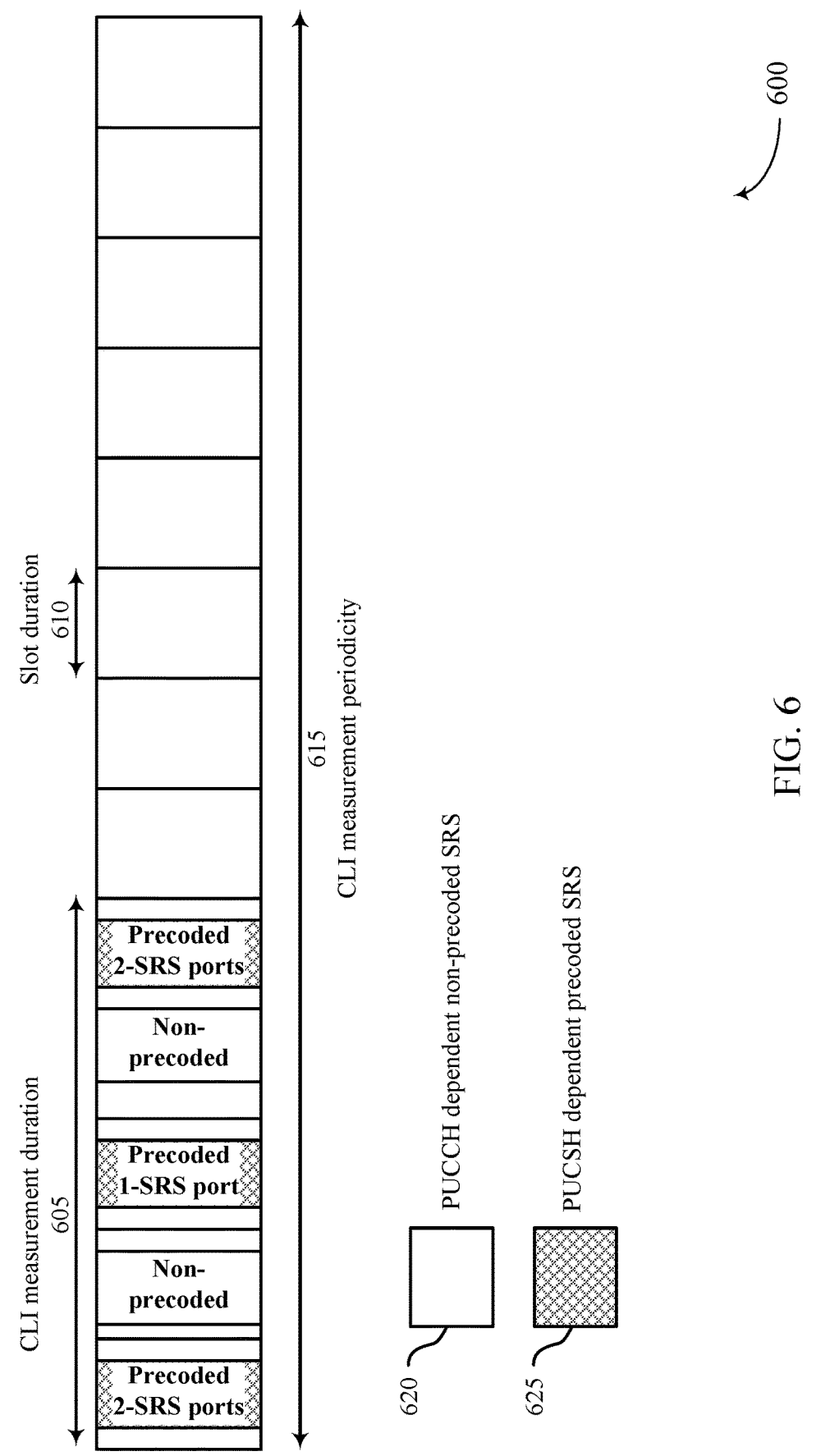
FIG. 6 illustrates an example of CLI transmission parameters that support measurement and reporting for UE-to-UE cross-link interference in accordance with aspects of the present disclosure.

FIG. 6 illustrates an example of CLI transmission parameters 600 that support measurement and reporting for UE-to-UE cross-link interference in accordance with aspects of the present disclosure. In some examples, CLI transmission parameters 600 may implement aspects of wireless communications system 100 or 200. In this example, a CLI measurement duration 605 may be configured based on slot-level SRS transmissions with a slot duration 610. Example aspects described herein may include configuring a CLI measurement periodicity 615.

In the example illustrated in FIG. 6, the CLI measurement duration 605 may span five slots. The five slots may correspond to flexible slots, downlink slots at a victim UE, or uplink slots at an aggressor UE. At the aggressor UE, transmission parameters of the uplink transmissions may be dependent on the type of transmission in each slot. For example, PUCCH transmissions may be precoded differently than PUSCH transmissions. In an example of obtaining a representative measurement of CLI at the victim UE, the aggressor UE may transmit a PUSCH/PUCCH dependent SRS transmission for CLI measurement, which may provide a measured SRS-RSRP/RSSI that reflects the actual interference of other uplink transmissions. In an example where a codebook SRS is to be used for CLI measurement, the SRS transmission is not precoded, but PUSCH may be precoded. In an example where non-codebook SRS is to be used for CLI measurement, the precoding of SRS may be different from that of PUSCH. In some examples, SRS antenna switching may be used for CLI measurement.

Thus, according to example aspects described herein, SRS transmission for CLI measurement may use one or more transmission parameters of a prior uplink transmission of the aggressor UE. For example, SRS transmissions may be aligned with the latest PUSCH transmission (e.g., most recent PUSCH transmission) in terms of transmission precoding and number of antenna ports. In such an example, precoding may be based on a transmitted precoding matrix indicator (TPMI) in the latest uplink grant (e.g., most recent uplink grant) for codebook based PUSCH, or based on a SRS resource indicator (SRI) in a latest uplink grant (e.g., most recent uplink grant) for non-codebook based PUSCH and a number of SRS ports aligned with the number of PUSCH layers. In such cases, PUCCH transmissions may be precoded differently from PUSCH, and SRS transmissions may be adapted to provide precoded or non-precoded SRS transmissions to account for PUCCH interference.

In the example of FIG. 6, a PUCCH dependent non-precoded SRS 620 may be transmitted in some slots during the CLI measurement duration 605, and a PUSCH dependent precoded SRS 625 may be transmitted in other slots during the CLI measurement duration 605. In some cases, for the PUCCH dependent non-precoded SRS 620, a single port SRS transmission may be used with the same transmission scheme and uplink power control as the latest PUCCH (e.g., the transmission power associated with the PUCCH dependent non-precoded SRS 620 may be equal to the transmission power associated with a most recent PUCCH, for example, a prior PUCCH). In some cases, for the PUSCH dependent precoded SRS 625, the SRS transmission may include precoding, a number of SRS ports, and transmission power aligned with the latest PUSCH (e.g., the transmission power associated with the PUSCH dependent precoded SRS 625 may be equal to the transmission power associated with the most recent PUSCH, for example, a prior PUSCH). The CLI measurement may, in such cases, provide a time domain averaged SRS-RSRP/RSSI representative of the actual interference from both PUCCH and PUSCH transmissions of the aggressor UE.

Figure 7:
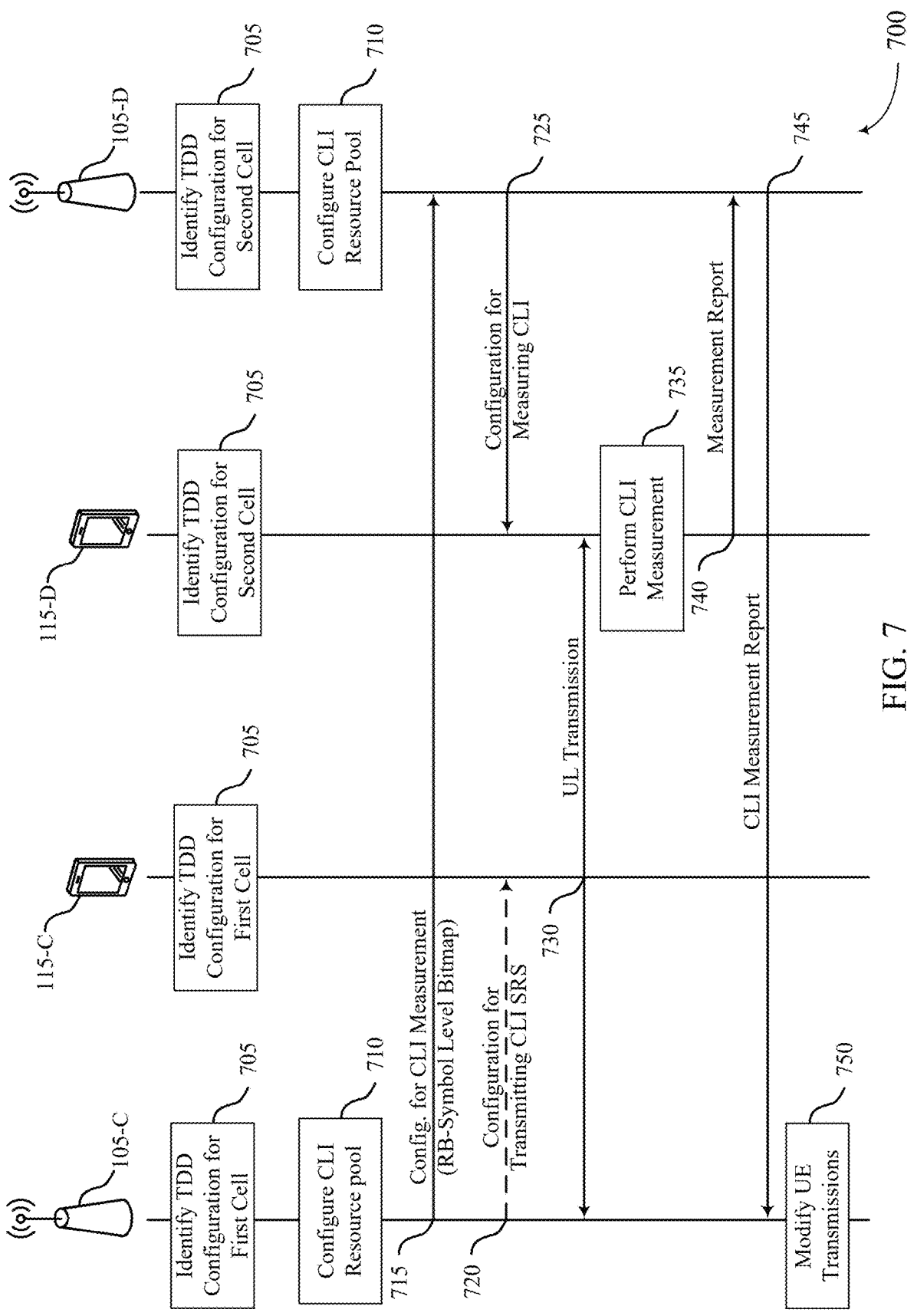
FIG. 7 illustrates an example of a process flow that supports measurement and reporting for UE-to-UE cross-link interference in accordance with aspects of the present disclosure.

FIG. 7 illustrates an example of a process flow 700 that supports measurement and reporting for UE-to-UE cross-link interference in accordance with aspects of the present disclosure. In some examples, process flow 700 may implement aspects of wireless communications system 100. The process flow 700 may include UE 115-c and UE 115-d, which may each be an example of a UE 115 as described herein. The process flow 700 may include base station 105-c and base station 105-d, which may each be an example of a base station 105 as described herein. The base stations 105 may each be associated with a cell which provides wireless communications with the base station 105 within a coverage area. UE 115-c may be served by a first cell associated with base station 105-c. UE 115-d may be served by a second cell associated with base station 105-d. Alternative examples of the following may be implemented, where some steps are performed in a different order than described or are not performed at all. In some cases, steps may include additional features not mentioned below, or further steps may be added.

At 705, UE 115-c may identify a first TDD configuration for the first cell, where the first TDD configuration includes a first symbol pattern for a slot. UE 115-d may identify a second TDD configuration for the second cell, where the second TDD configuration includes a second symbol pattern for the slot. Base station 105-c may identify the first TDD configuration for the first cell of base station 105-c, where the first TDD configuration includes the first symbol pattern for the slot. Base station 105-d may identify the second TDD configuration for the second cell of base station 105-d, where the second TDD configuration includes the second symbol pattern for the slot (e.g., the second symbol pattern for the second cell for the slot). In some cases, the base stations 105 (e.g., base station 105-c and base station 105-d)

may determine an overlap between a downlink symbol (or a flexible symbol) and an uplink symbol during one or more symbols of the slot based on first TDD configuration of the first cell and the second TDD configuration of the second cell, and based on the overlap, determine that CLI measurements should be performed. For example, base station 105-*d* may communicate its intended TDD configuration for the slot to base station 105-*d* (or vice versa).

At 710, the base stations 105 (e.g., base station 105-*c* and base station 105-*d*) may configure a CLI resource pool. The CLI resource pool may include a number of CLI resources and associated CLI parameters for the CLI resources. For example, the CLI resource pool may provide a RB-level mapping between resources and one or more associated transmission or reception parameters (e.g., transmission bandwidth, transmission duration, time-frequency resource, cyclic shift, periodicity of CLI measurements, slot offset of the resource pool, frequency hopping pattern, reference signal base sequence, or any combinations thereof). Base stations 105 may exchange information related to the CLI resource pool via backhaul signaling, in some cases. In some cases, base stations 105 may be provided with the CLI resource pool (e.g., by a network node, ANC, gNB, etc.).

At 715, the base station 105-*c* may transmit to base station 105-*d* configuration information (e.g., an intended TDD configuration for the slot) for CLI measurement. In some cases, the configuration information may be a RB-symbol-level bitmap that indicates the identified conflicting TDD symbols of the TDD configurations of the base stations 105.

Optionally, at 720, the base station 105-*c* may transmit a configuration to the UE 115-*c* for transmitting CLI SRSs (e.g., a CLI SRS configuration). In some cases, the CLI SRS configuration may be based on the CLI resource pool and the identified resources mapped to the RB-level bitmap. In some cases, the CLI SRS configuration may indicate that the UE 115-*c* is to use transmission parameters for the SRS transmissions that correspond to a prior PUCCH or PUSCH transmission of the UE 115-*c*.

At 725, the base station 105-*d* may transmit a configuration to the UE 115-*d* for measuring CLI (e.g., a CLI measurement configuration). In some cases, the CLI measurement configuration may be based on the CLI resource pool and the identified resources mapped to the RB-level bitmap. In some cases, the CLI measurement configuration may indicate a resource set and one or more measurement parameters that are to be provided by the UE 115-*d* in a CLI report. In some cases, the CLI report may include one or more L1-RSRP parameter measurements associated with one or more of RSRP, RSSI, other measurements, or combinations thereof.

At 730, the UE 115-*c* may transmit uplink transmissions. The uplink transmissions may include SRS transmissions, or other uplink transmissions (e.g., PUSCH or PUCCH transmissions). At 735, the UE 115-*d* may perform CLI measurements on the uplink transmissions. The CLI measurements may measure, for example, RSSI, RSRP, or both, in accordance with the CLI measurement parameters provided to the UE 115-*d*.

At 740, the UE 115-*d* may transmit a measurement report to base station 105-*d*. The measurement report may include indications of one or more measurement parameters, such as one or more L1-RSRP parameters that were configured by the base station 105-*d*. The measurement report may be transmitted, for example, using PUCCH transmissions to the base station 105-*d*, using a format that corresponds to a CSI report.

At 745, the base station 105-*d* may transmit a CLI measurement report to the base station 105-*c*. The base station 105-*c* may receive the CLI measurement report and, at 750, modify one or more UE transmissions based on the CLI measurement report. For example, if CLI measurements are above a threshold value, the base station 105-*d* may change the first TDD configuration to a more aggressive TDD configuration or provide for increased transmit power to be used at UE 115-*c*. If CLI measurements are below a threshold value, the base station 105-*c* may change the first TDD configuration to be less aggressive or provide for reduced transmit power to be used at the UE 115-*c*, or combinations thereof.

Figure 8:
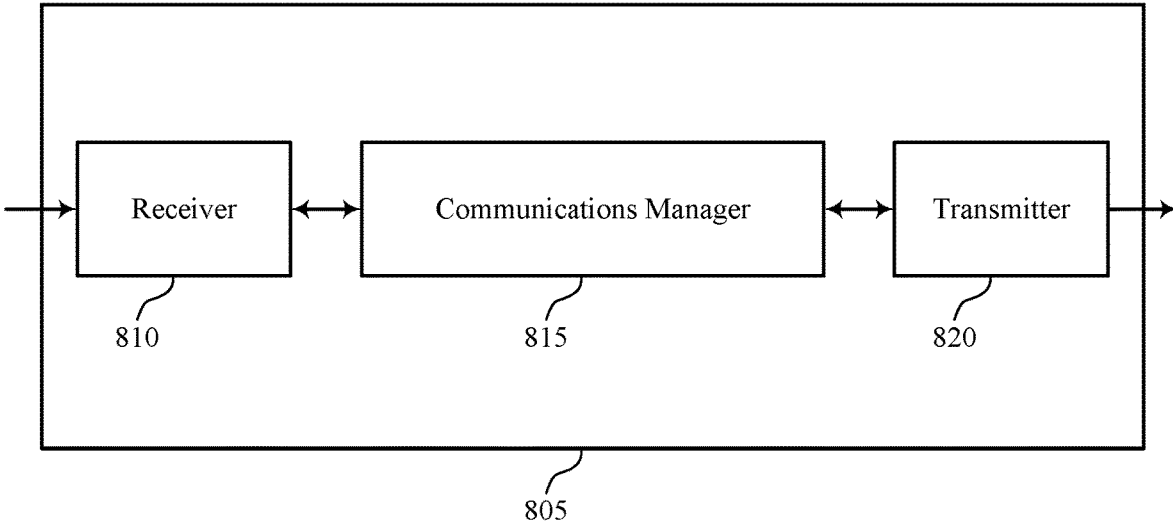
FIGS. 8 and 9 show block diagrams of devices that support measurement and reporting for UE-to-UE cross-link interference in accordance with aspects of the present disclosure.
Figure 8:

FIG. 8 shows a block diagram 800 of a device 805 that supports measurement and reporting for UE-to-UE cross-link interference in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to measurement and reporting for UE-to-UE cross-link interference, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify one or more resource sets for measuring CLI from one or more other UEs, where each resource set has one or more parameter measurements that are to be reported by the first UE, measure, for each resource set, one or more reference signals received at the first UE from the one or more other UEs, determine, based on the measuring, the one or more parameter measurements for each resource set, and transmit a CLI report to a base station that includes the one or more parameter measurements for each resource set.

The communications manager 815 may also receive an indication from a base station to transmit one or more SRSs for CLI measurement using one or more resource sets, apply one or more transmission parameters to the one or more SRSs to be transmitted using the one or more resource sets, where the one or more transmission parameters are determined based on a most recent uplink transmission to the base station using the corresponding resource set, and transmit the one or more SRSs based on the applying. The communications manager 815 may be an example of aspects of the communications manager 1110 described herein.

The actions performed by the communications manager 815 as described herein may be implemented to realize one or more potential advantages. One implementation may allow a UE 115 to save power and increase battery life by communicating with a base station based on less aggressive TDD configurations. Example implementations may provide improved spatial reuse, as interference between transmitted signals may be reduced. Additionally or alternatively, the UE 115 may increase transmission throughput by communicating with a base station based on more aggressive TDD configurations.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:

FIG. 9 shows a block diagram 900 of a device 905 that supports measurement and reporting for UE-to-UE cross-link interference in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to measurement and reporting for UE-to-UE cross-link interference, etc.).

The communications manager 915 may be an example of aspects of the communications manager 815 as described herein. The communications manager 915 may include a CLI resource manager 920, a measurement component 925, a CLI transmission manager 930, and a CLI configuration manager 935. The communications manager 915 may be an example of aspects of the communications manager 1110 described herein.

The transmitter 940 may transmit signals generated by other components of the device 905. In some examples, the transmitter 940 may be collocated with the receiver 910 in a transceiver module. For example, the transmitter 940 may be an example of aspects of the transceiver 1120 described with reference to FIG. 11. The transmitter 940 may utilize a single antenna or a set of antennas. The transmitter 940 may transmit output signals 980.

In an example where the device 905 is a victim UE, the device 905 may receive a configuration signal 945 transmitted to the device 905, from a base station 105, for measuring CLI (e.g., the configuration signal 945 may include CLI measurement configuration information 950). In some cases, the CLI measurement configuration information 950 may be based on a CLI resource pool and identified resources mapped to an RB-level bitmap. The CLI measurement configuration information 950 may include a set of bits indicating one or more CLI measurement configurations. In an example aspect, the configuration signal 945 may include uplink transmission information 951 from an aggressor UE. For example, uplink transmission information 951 may include sets of bits indicating one or more reference signals (e.g., SRS transmissions) or other uplink transmissions (e.g., PUSCH or PUCCH transmissions).

In some aspects, the configuration signal 945 may be passed on to other components of the device 905. For example, where the device 905 is a victim UE, the receiver 910 may electrically send the CLI measurement configuration information 950 to the communications manager 915 (e.g., to the CLI resource manager 920, the measurement component 925, or both). In another example where the device is a victim UE, the receiver 910 may electrically send the uplink transmission information 951 to the communications manager 915 (e.g., to the CLI resource manager 920, the measurement component 925, or both).

The CLI resource manager 920 may receive, from the receiver 910, the CLI measurement configuration information 950, the uplink transmission information 951, or both. Based on the CLI measurement configuration information 950, the CLI resource manager 920 may identify one or more resource sets for measuring CLI from one or more other UEs (e.g., aggressor UEs), where each resource set includes one or more parameter measurements that are to be reported by the device 905. For example, based on the CLI measurement configuration information 950, the CLI resource manager 920 may identify resource sets and measurement parameters that are to be provided by the device 905 in a CLI report. The CLI resource manager 920 may output, to the measurement component 925, measurement parameter information 960 indicating the resource sets and measurement parameters (e.g., CLI measurement parameters).

The measurement component 925 may measure, for each of the resource sets, one or more reference signals received at the device 905 from the one or more other UEs (e.g., aggressor UEs) and determine, based on the measuring, the one or more parameter measurements for each resource set. The measurement component 925 may receive the uplink transmission information 951 from the receiver 910. In an example, based on the measurement parameter information 960 received from the CLI resource manager 920, the measurement component 925 may perform CLI measurements on uplink transmissions included in the uplink transmission information 951. The measurement component 925 may measure, for example, RSSI, RSRP, or both, in accordance with the measurement parameter information 960 (e.g., in accordance with resource sets, CLI measurement parameters, or both). The measurement component 925 may output measurement information 965 (e.g., a CLI report) to the CLI transmission manager 930. The measurement information 965 may include a set of bits indicating the CLI measurements (e.g., RSSI, RSRP) associated with the uplink transmissions included in the uplink transmission information 951.

The CLI transmission manager 930 may output reporting information 975 to the transmitter 940. The reporting information 975 may include the measurement information 965 (e.g., CLI report that includes the one or more parameter measurements for each resource set) output by the measurement component 925. In an example, the CLI transmission manager 930 may identify parameter measurements to report for each resource set based on the CLI measurement configuration information 950.

The device 905, via the transmitter 940, may transmit the output signals 980 (e.g., including the reporting information 975) to a base station using PUCCH transmissions, for example, using a format that corresponds to a CSI report.

In another example, where the device 905 is an aggressor UE, the device 905 may receive an SRS configuration signal 946 transmitted to the device 905, from a base station 105, for transmitting CLI SRSs. In some cases, the SRS configuration signal 946 may include CLI SRS configuration information 955. The CLI SRS configuration information 955 may be based on the CLI resource pool and the identified resources mapped to the RB-level bitmap. In some cases, the CLI SRS configuration information 955 may include sets of bits indicating transmission parameters 970 the device 105 is to use for SRS transmissions that correspond to a prior PUCCH or PUSCH transmission of the device 905.

In some aspects, the SRS configuration signal 946 may be passed on to other components of the device 905. For example, where the device is an aggressor UE, the receiver 910 may electrically send the CLI SRS configuration information 955 to the communications manager 915 (e.g., to the CLI configuration manager 935). The receiver 910 may be an example of aspects of the transceiver 1120 described with reference to FIG. 11. The receiver 910 may utilize a single antenna or a set of antennas.

The CLI configuration manager 935 may receive, from the receiver 910, the CLI SRS configuration information 955. Based on the CLI SRS configuration information 955, the CLI configuration manager 935 may identify one or more SRSs to transmit for CLI measurement, for example, using one or more resource sets. The CLI configuration manager 935 may output transmission parameters 970 to the CLI transmission manager 930. The transmission parameters 970 may include a set of bits indicating parameters of signals to be transmitted by the device 905 (e.g., parameters of SRS transmissions to be transmitted by the device 905).

The CLI transmission manager 930 may output transmission information 976 to the transmitter 940. The transmission information 976 may include the transmission parameters 970, which the transmitter 940 may apply to SRSs to be transmitted by the transmitter 940.

The transmitter 940 may apply one or more transmission parameters (e.g., the transmission parameters 970, as included in the transmission information 976) to one or more SRSs to be transmitted using the one or more resource sets, where the one or more transmission parameters are determined based on a most recent uplink transmission (e.g., from the device 905) to a base station using the corresponding resource set. The device 905, via the transmitter 940, may transmit the one or more SRSs (e.g., to a victim UE) based on the applying. In an example, the output signals 980 may include the one or more SRSs.

Figure 10:
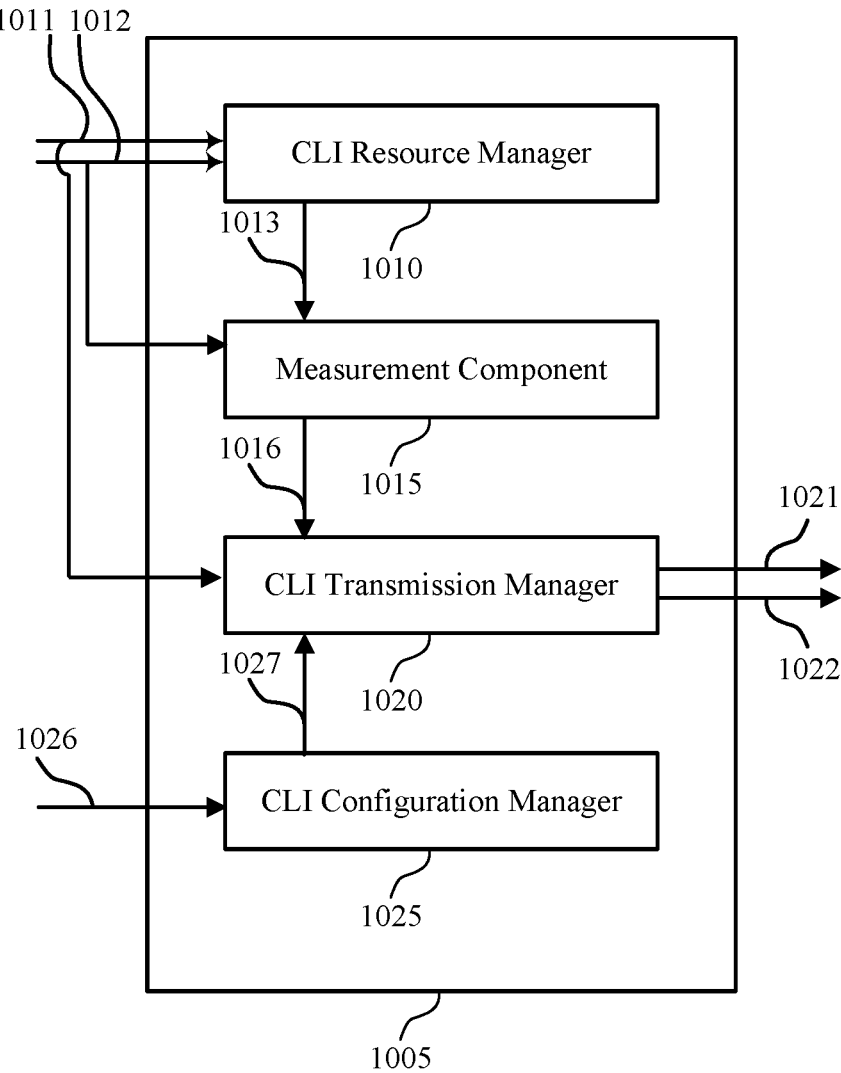
FIG. 10 shows a block diagram of a communications manager that supports measurement and reporting for UE-to-UE cross-link interference in accordance with aspects of the present disclosure.

FIG. 10 shows a block diagram 1000 of a communications manager 1005 that supports measurement and reporting for UE-to-UE cross-link interference in accordance with aspects of the present disclosure. The communications manager 1005 may be an example of aspects of a communications manager 815, a communications manager 915, or a communications manager 1110 described herein. The communications manager 1005 may include a CLI resource manager 1010, a measurement component 1015, a CLI transmission manager 1020, and a CLI configuration manager 1025. Each of these modules may communicate, directly or indirectly, with one another (e.g., via one or more buses).

In an example where the communications manager 1005 is of a victim UE, the communications manager 1005 (e.g., the CLI resource manager 1010) may identify one or more resource sets for measuring CLI from one or more other UEs (e.g., aggressor UEs), where each resource set has one or more parameter measurements that are to be reported by the victim UE. In some examples, the CLI resource manager 1010 may receive, from a serving base station, CLI measurement configuration information 1011. The CLI measurement configuration information 1011 may include configuration signaling inclusive of a bitmap indicating resource sets from a common resource pool configuration, where each resource set is associated with a bit in the bitmap. In some cases, the one or more resource sets and the number of parameter measurements to be reported for each resource set are received in the configuration signaling.

The communications manager 1005 (e.g., the measurement component 1015) may measure, for each resource set, one or more reference signals included in uplink transmission information 1012 received at the victim UE from one or more other UEs (e.g., an aggressor UE). In some examples, the measurement component 1015 may determine, based on the measuring, the one or more parameter measurements for each resource set. In some cases, the one or more parameter measurements include one or more of a RSRP measurement, a RSSI measurement, or combinations thereof, to be reported based on a signal included in the uplink transmission information 1012 received at the victim UE from the one or more other UEs. In some cases, the signal included in the uplink transmission information 1012 received at the victim UE from the one or more other UEs may include a SRS or an uplink transmission signal transmitted by the one or more other UEs. The measurement component 1015 may output measurement information 1016 to the CLI transmission manager 1020. The measurement information 1016 may include a set of bits indicating the one or more parameter measurements (e.g., a RSRP measurement, a RSSI measurement, or combinations thereof) for each resource set.

The communications manager 1005 (e.g., the CLI transmission manager 1020) may transmit a CLI report to a base station that includes the one or more parameter measurements for each resource set. For example, the communications manager (e.g., the CLI transmission manager 1020) may transmit measurement information 1021, where the measurement information 1021 may include a set of bits indicating the CLI report.

In some examples, the communications manager 1005 (e.g., the CLI transmission manager 1020) may identify a number of parameter measurements to be reported for each resource set and, for each parameter measurement, an associated RI within the corresponding resource set that is to be reported with each parameter measurement. In an example, the CLI transmission manager 1020 may identify the number of parameter measurements and the RIs based on the CLI measurement configuration information 1011.

In an example where the communications manager 1005 is of an aggressor UE, the communications manager 1005 (e.g., the CLI configuration manager 1025) may receive CLI SRS configuration information 1026 from a base station. The CLI SRS configuration information 1026 may include an indication from a base station to transmit one or more SRSs for CLI measurement using one or more resource sets. The CLI configuration manager 1025 may output transmission parameters 1027 to the CLI transmission manager 1020. The transmission parameters 1027 may include a set of bits indicating parameters of signals (e.g., SRS transmissions) to be transmitted by the communications manager 1005 (e.g., by the aggressor UE).

The communications manager 1005 (e.g., the CLI transmission manager 1020) may apply one or more transmission parameters (e.g., the transmission parameters 1027) to the one or more SRSs to be transmitted using the one or more resource sets, where the one or more transmission parameters are determined based on a most recent uplink transmission from the aggressor UE to the base station using the corresponding resource set. In some examples, the CLI transmission manager 1020 may transmit the one or more SRSs (e.g., to a victim UE) based on the applying. In an example, the communications manager 1005 (e.g., the aggressor UE) may transmit output signals 1022 which include the one or more SRSs.

In some examples, the communications manager 1005 (e.g., the CLI transmission manager 1020) may identify a first resource set of the one or more resource sets that corresponds to resources used in a prior uplink control channel transmission and a second resource set of the one or more resource sets that corresponds to resources used in a prior uplink shared channel transmission. In an example, the CLI transmission manager 1020 may identify the first and second resource sets based on the CLI SRS configuration information 1026 (e.g., the transmission parameters 1027). In some examples, the CLI transmission manager 1020 may apply a same transmission scheme and uplink power control as the prior uplink control channel transmission to generate a non-precoded single port SRS transmission via the first resource set. In some examples, the CLI transmission manager 1020 may apply a transmission precoding, number of antenna ports, and transmission power that is aligned with the prior uplink shared channel transmission to generate a precoded multi-port SRS transmission via the second resource set.

Figure 11:
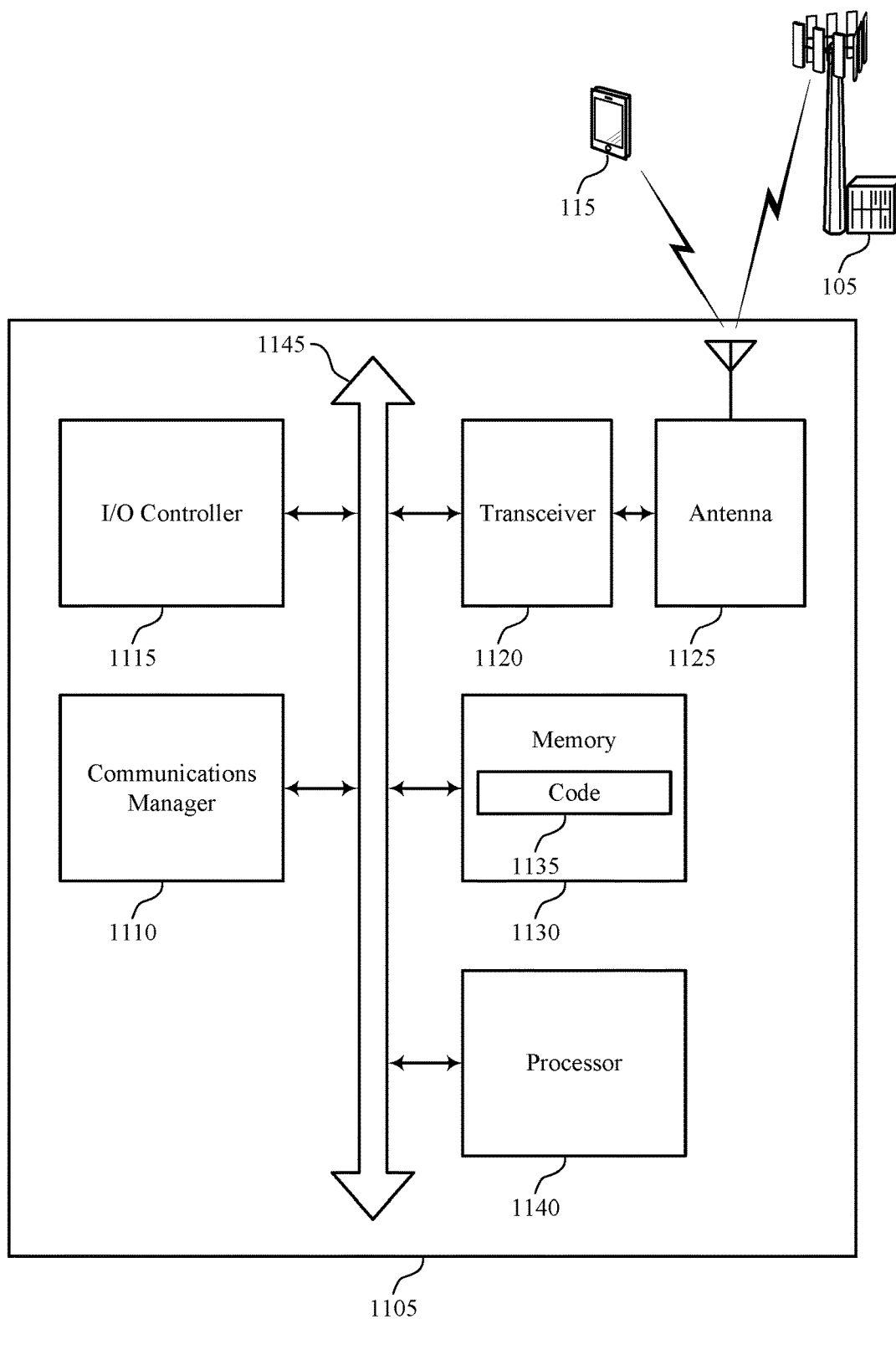
FIG. 11 shows a diagram of a system including a device that supports measurement and reporting for UE-to-UE cross-link interference in accordance with aspects of the present disclosure.

FIG. 11 shows a diagram of a system 1100 including a device 1105 that supports measurement and reporting for UE-to-UE cross-link interference in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify one or more resource sets for measuring CLI from one or more other UEs, where each resource set includes one or more parameter measurements that are to be reported by the first UE, measure, for each resource set, one or more reference signals received at the first UE from the one or more other UEs, determine, based on the measuring, the one or more parameter measurements for each resource set, and transmit a CLI report to a base station that includes the one or more parameter measurements for each resource set.

The communications manager 1110 may also receive an indication from a base station to transmit one or more SRSs for CLI measurement using one or more resource sets, apply one or more transmission parameters to the one or more SRSs to be transmitted using the one or more resource sets, where the one or more transmission parameters are determined based on a most recent uplink transmission to the base station using the corresponding resource set, and transmit the one or more SRSs based on the applying.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may include more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting measurement and reporting for UE-to-UE cross-link interference).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
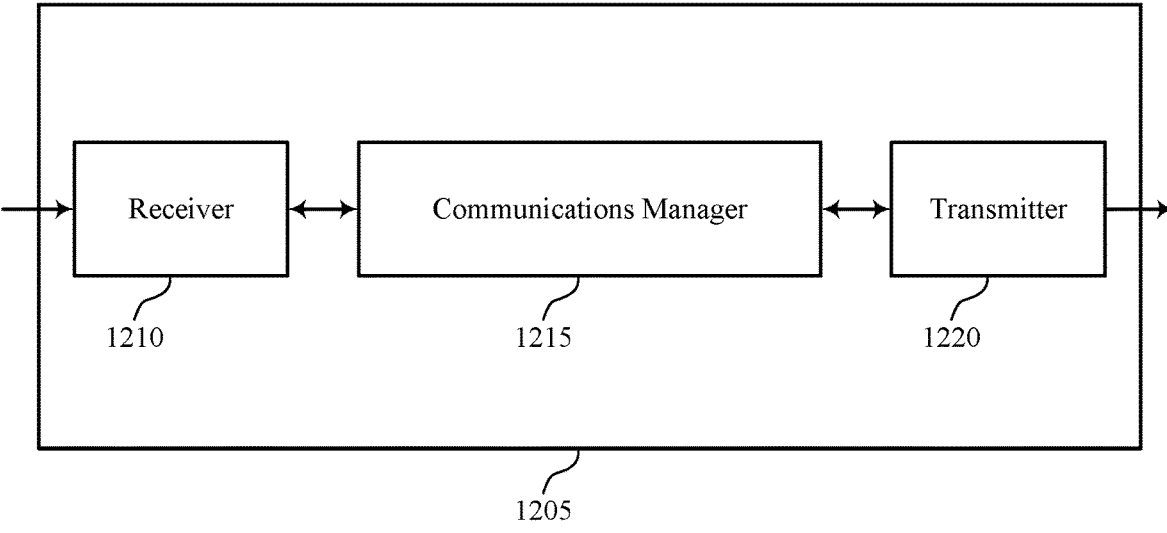
FIGS. 12 and 13 show block diagrams of devices that support measurement and reporting for UE-to-UE cross-link interference in accordance with aspects of the present disclosure.

FIG. 12 shows a block diagram 1200 of a device 1205 that supports measurement and reporting for UE-to-UE cross-link interference in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to measurement and reporting for UE-to-UE cross-link interference, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a first TDD configuration for communications with at least a first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol, receive, from a second base station, a second TDD configuration for communications between the second base station and at least a second UE served by the second base station, determine a common resource pool configuration between the first base station and the second base station for CLI measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration, and initiate the CLI measurement between the first UE and the second UE based on the common resource pool configuration.

The communications manager 1215 may also identify, for a first UE that is served by the first base station, one or more resource sets for measurement of CLI of one or more other UEs at the first UE, where each resource set includes one or more parameter measurements that are to be reported by the first UE, transmit an indication to the first UE of the identified one or more resource sets, and receive, from the first UE, a CLI report that includes the one or more parameter measurements of the first UE for each resource set. The communications manager 1215 may be an example of aspects of the communications manager 1510 described herein.

The actions performed by the communications manager 1215 as described herein may be implemented to realize one or more potential advantages. One implementation may allow a base station 105 to save power by communicating with a UE based on less aggressive TDD configurations. Example implementations may provide improved spatial reuse, as interference between transmitted signals may be reduced. Additionally or alternatively, the base station 105 may increase transmission throughput by communicating with a UE based on more aggressive TDD configurations.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
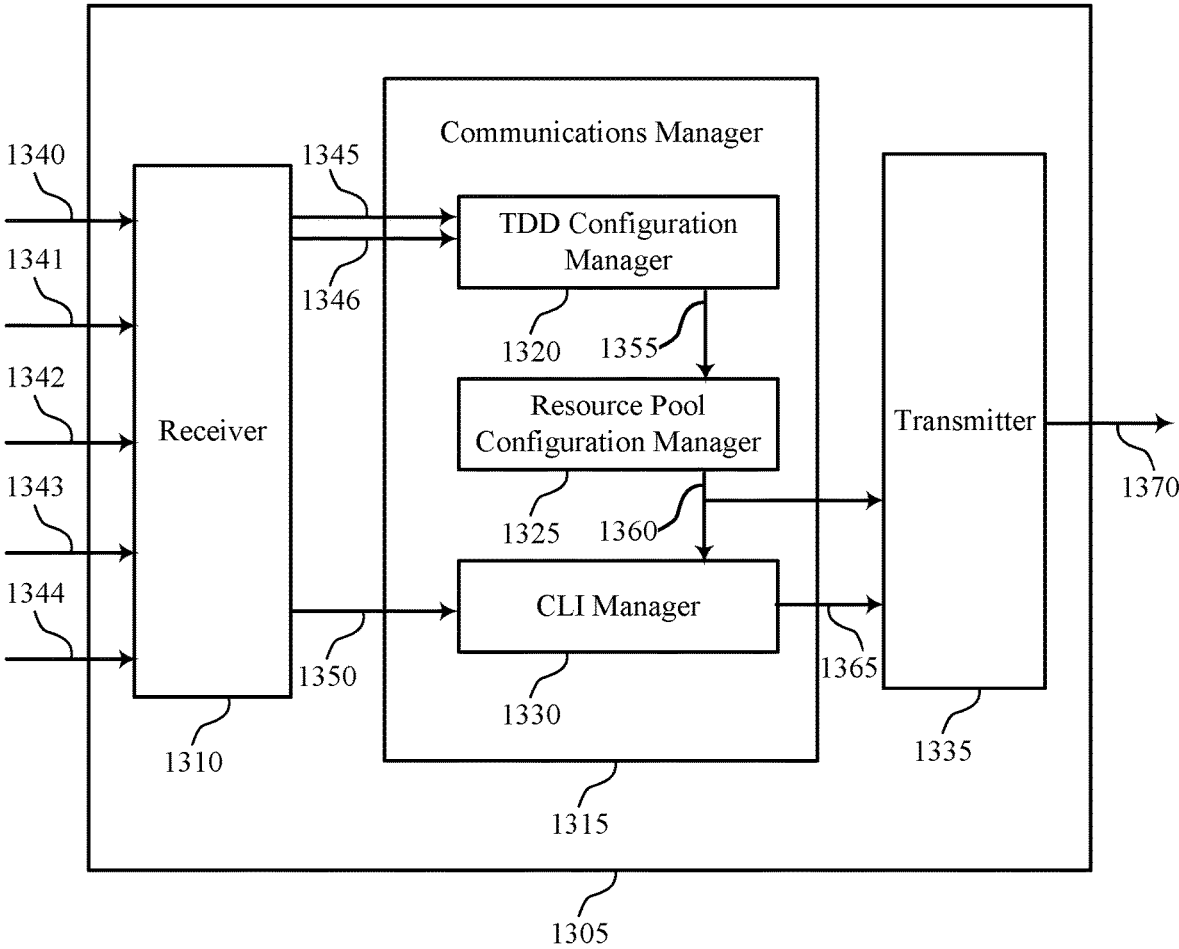

FIG. 13 shows a block diagram 1300 of a device 1305 that supports measurement and reporting for UE-to-UE cross-link interference in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to measurement and reporting for UE-to-UE cross-link interference, etc.). The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a TDD configuration manager 1320, a resource pool configuration manager 1325, and a CLI manager 1330. The communications manager 1315 may be an example of aspects of the communications manager 1510 described herein.

The transmitter 1335 may transmit signals generated by other components of the device 1305 as described herein. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

In an example where the device 1305 is a base station associated with a victim UE, the device 1305 (e.g., at the receiver 1310) may receive CLI measurement configuration information 1340 (e.g., an intended TDD configuration) from another base station (e.g., a base station associated with an aggressor UE). In some cases, the CLI measurement configuration information 1340 may include a set of bits indicating a bitmap (e.g., a RB-level bitmap), where the bitmap may identify conflicting TDD symbols of TDD configurations of the base stations.

The device 1305 (e.g., at the receiver 1310) may receive a measurement report 1341 from the victim UE. The measurement report 1341 may include a set of bits indicating or more measurement parameters as determined (e.g., measured) by the victim UE, such as one or more L1-RSRP parameters that were configured by the device 1305. The measurement report 1341 may be received, for example, via PUCCH transmissions from the victim UE, using a format that corresponds to a CSI report.

The receiver 1310 may output a CLI report 1350 to the CLI manager 1330. The CLI report 1350 may include, for example, the measurement report 1341. The CLI report 1350 may include one or more parameter measurements of the victim UE for each resource set for measurement of CLI of one or more other UEs.

The resource pool configuration manager 1325 may identify, for a victim UE that is served by the device 1305, one or more resource sets for measurement of CLI of one or more other UEs (e.g., an aggressor UE) at the victim UE, where each resource set includes one or more parameter measurements that are to be reported by the victim UE. The resource pool configuration manager 1325 may transmit an indication (e.g., CSI resource pool information 1360) to the victim UE of the identified one or more resource sets, for example, via signal 1370 output by the transmitter 1335.

The CLI manager 1330 may initiate the CLI measurement between the victim UE and the one or more other UEs (e.g., the aggressor UE) based on the common resource pool configuration included in the CSI resource pool information 1360. The CLI manager 1330 may output CLI measurement configuration information 1365 to the transmitter 1335, which the transmitter 1335 may include in signal 1370 transmitted to the victim UE. The CLI measurement configuration information 1365 may include, for example, TDD configuration information 1355, the CSI resource pool information 1360, or both.

The transmitter 1335 may transmit signal 1370 to the victim UE. The signal 1370 may include the CLI measurement configuration information 1365 for measuring CLI.

Information may be passed on to other components of the device 1305. For example, the receiver 1310 may electrically send CLI measurement information 1345 to the communications manager 1315 (e.g., to TDD configuration manager 1320, resource pool configuration manager 1325, CLI manager 1330, or any combination thereof).

In an example where the device 1305 is a base station associated with an aggressor UE, the device 1305 (e.g., at the receiver 1310) may receive uplink transmissions 1342 from the aggressor UE. The uplink transmissions 1342 may include, for example, PUSCH or PUCCH transmissions.

The device 1305 (e.g., at the receiver 1310) may receive a CLI measurement report 1343 from another base station (e.g., a base station associated with a victim UE). The CLI measurement report 1343 may include a set of bits indicating CLI measurements as determined (e.g., measured) by a victim UE, for example, CLI measurements transmitted to the other base station by the victim UE. The device 1305 may modify one or more UE transmissions (e.g., by the aggressor UE) based on the CLI measurement report 1343, as described herein with respect to the TDD configuration manager 1320, resource pool manager 1325, CLI manager 1330, and transmitter 1335.

Based on the CLI measurement report 1343, the receiver 1310 may output CLI measurement information 1345 to the TDD configuration manager 1320. The CLI measurement information 1345 may include a set of bits indicating the CLI measurements included in the CLI measurement report 1343.

The TDD configuration manager 1320 may compare the CLI measurements included in the CLI measurement information 1345 to a threshold value. In an example where the TDD configuration manager 1320 determines the CLI measurements are above the threshold value, the device 1305 (e.g., the TDD configuration manager 1320) may change the first TDD configuration to a more aggressive TDD configuration or provide for increased transmit power to be used at the aggressor UE. In an example where the TDD configuration manager 1320 determines the CLI measurements are below the threshold value, the device 1305 (e.g., the TDD configuration manager 1320) may change the first TDD configuration to be less aggressive or provide for reduced transmit power to be used at the aggressor UE. The TDD configuration manager 1320 may output TDD configuration information 1355 to the resource pool configuration manager 1325. In some examples, the TDD configuration information 1355 may include a set of bits indicating a TDD configuration, modifications to the TDD configuration, or a combination thereof.

The resource pool configuration manager 1325 may configure a CLI resource pool based on the TDD configuration information 1355. The resource pool manager 1335 may output CSI resource pool information 1360 to the CLI manager 1330, the transmitter 1335, or both. In some aspects, the CSI resource pool information 1360 may include a set of bits indicating a CLI resource pool and identified resources mapped to an RB-level bitmap. For example, the CSI resource pool information 1360 may include a set of bits indicating a number of CLI resources and associated CLI parameters for the CLI resources. In an example, the CLI resource pool included in the CSI resource pool information 1360 may provide a RB-level mapping between resources and one or more associated transmission or reception parameters (e.g., transmission bandwidth, transmission duration, time-frequency resource, cyclic shift, periodicity of CLI measurements, slot offset of the resource pool, frequency hopping pattern, reference signal base sequence, or any combinations thereof).

The transmitter 1335 may transmit signal 1370 to the aggressor UE. The signal 1370 may include the CSI resource pool information 1360.

Information may be passed on to other components of the device 1305. For example, the receiver 1310 may electrically send CLI report 1350 to the communications manager 1315 (e.g., to the TDD configuration manager 1320, the resource pool configuration manager 1325, the CLI manager 1330, or any combination thereof).

In an example aspect where the device 1305 is a base station associated with, or serving, a first UE (e.g., a victim UE or an aggressor UE), the TDD configuration manager 1320 may identify a first TDD configuration for communications with at least the first UE served by the device 1305, where the first TDD configuration indicates, for each symbol of a set of symbols within a slot, whether the symbol is a downlink symbol, an uplink symbol, a guard period symbol, or a flexible symbol that may be configured as either an uplink or downlink symbol.

The device 1305 (e.g., at the receiver 1310) may receive a TDD configuration 1344 from a second base station. The TDD configuration 1344 may include, for example, a second TDD configuration 1346 for communications between the second base station and at least a second UE (e.g., an aggressor UE) served by the second base station.

The receiver 1310 may output the second TDD configuration 1346 to the TDD configuration manager 1320. The second TDD configuration 1346 may include a set of bits indicating configurations associated with symbols of the second TDD configuration 1346 (e.g., for each symbol of a set of symbols within a slot, whether the symbol is a downlink symbol, an uplink symbol, a guard period symbol, or a flexible symbol that may be configured as either an uplink or downlink symbol).

The TDD configuration manager 1320 may forward the second TDD configuration 1346 to the resource pool configuration manager 1325, for example, within TDD configuration information 1355.

Based on the first TDD configuration and the second TDD configuration 1346, the resource pool configuration manager 1325 may determine a common resource pool configuration between the device 1305 and the second base station for CLI measurement based on the first TDD configuration and the second TDD configuration 1346, where the common resource pool configuration includes a set of bits indicating one or more parameters for measuring CLI for each symbol of the first TDD configuration that is capable of having a conflicting transmission direction with a corresponding symbol of the second TDD configuration 1346.

The resource pool configuration manager 1325 may output the common resource pool configuration to the transmitter 1335, the CLI manager 1330, or both. For example, the resource pool configuration manager 1325 may include the common resource pool configuration within the CSI resource pool information 1360 as described herein.

The transmitter 1335 may transmit signal 1370 to the first UE, the second base station, or both. The signal 1370 may include CSI resource pool information 1360, CLI measurement configuration information 1365, or both.

Figure 14:
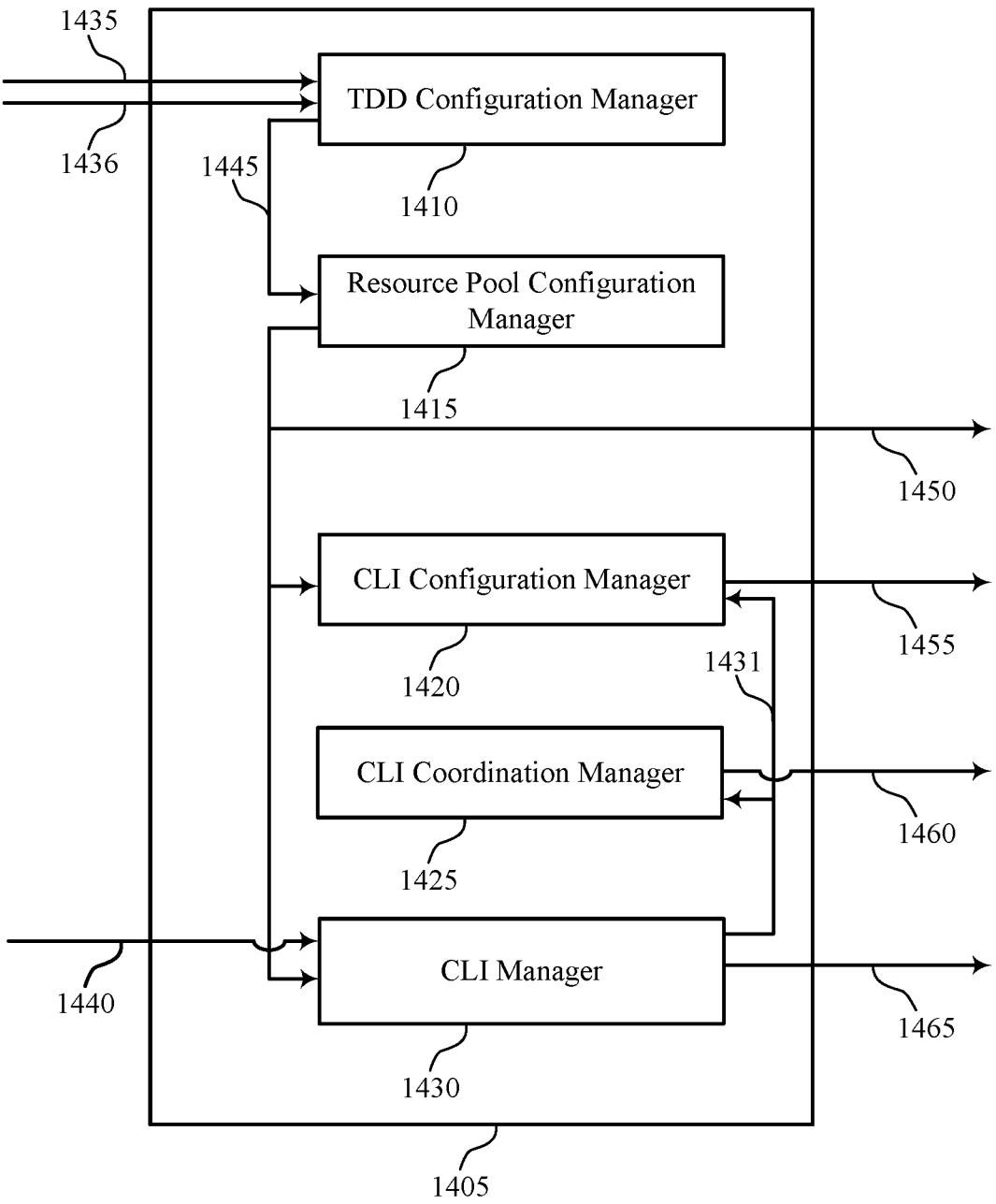
FIG. 14 shows a block diagram of a communications manager that supports measurement and reporting for UE-to-UE cross-link interference in accordance with aspects of the present disclosure.

FIG. 14 shows a block diagram 1400 of a communications manager 1405 that supports measurement and reporting for UE-to-UE cross-link interference in accordance with aspects of the present disclosure. The communications manager 1405 may be an example of aspects of a communications manager 1215, a communications manager 1315, or a communications manager 1510 described herein. The communications manager 1405 may include a TDD configuration manager 1410, a resource pool configuration manager 1415, a CLI configuration manager 1420, a CLI coordination manager 1425, and a CLI manager 1430. Each of these modules may communicate, directly or indirectly, with one another (e.g., via one or more buses).

In an example where the communications manager 1405 is of a base station associated with a victim UE, the CLI manager 1430 may receive a CLI report 1440 from the victim UE. The CLI report 1440 may include one or more parameter measurements of the victim UE for each resource set for measurement of CLI of one or more other UEs. The CLI report 1440 may be included, for example, in a measurement report received by the base station (e.g., a measurement report 1341 as described herein). The CLI manager 1430 may provide the CLI report 1440 to CLI configuration manager 1420, CLI coordination manager 1425, or both, for example, via CLI management information 1431.

The resource pool configuration manager 1415 may identify, for a victim UE that is served by the base station, one or more resource sets for measurement of CLI of one or more other UEs (e.g., an aggressor UE) at the victim UE, where each resource set includes one or more parameter measurements that are to be reported by the victim UE. The resource pool configuration manager 1415 may transmit an indication (e.g., CSI resource pool information 1450) to the victim UE of the identified one or more resource sets, for example, via a signal output by a transmitter of the base station.

In some examples, the resource pool configuration manager 1415 may identify a number of parameter measurements to be reported for each resource set and, for each parameter measurement, an associated RI within the corresponding resource set that is to be reported with each parameter measurement. The parameter measurements and associated RIs may be included in a common resource pool configuration, which the resource pool configuration manager 1415 may include in CSI resource pool information 1450. In some examples, the common resource pool configuration includes a set of resource sets for measurement of CLI, and a bitmap may indicate the one or more resource sets from the common resource pool configuration, where each resource set is associated with a bit in the bitmap. In some cases, the one or more parameters for measuring CLI include one or more of a transmission bandwidth, a transmission duration, a periodicity and slot offset of the resource pool, or any combinations thereof.

The CLI manager 1430 may initiate the CLI measurement between the victim UE and the one or more other UEs (e.g., the aggressor UE) based on the common resource pool configuration included in the CSI resource pool information 1450. The CLI manager 1430 may transmit CLI measurement information 1465 to the victim UE, for example, via a signal output by a transmitter of the base station. The CLI measurement information 1465 may include, for example, TDD configuration information 1445, the CSI resource pool information 1450, or both.

In some cases, the CLI configuration manager 1420 may transmit configuration signaling 1455 to the first UE that indicates the one or more resource sets and the number of parameter measurements to be reported for each resource set.

In an example where the communications manager 1405 is of a base station associated with an aggressor UE, the TDD configuration manager 1410 may receive CLI measurement information 1435 from another base station (e.g., a base station associated with a victim UE). The CLI measurement information 1435 may include a set of bits indicating CLI measurements included in a CLI measurement report received by the base station (e.g., the CLI measurement report 1343 as described herein).

The TDD configuration manager 1410 may compare the CLI measurements included in the CLI measurement information 1435 to a threshold value. In an example where the TDD configuration manager 1410 determines the CLI measurements are above the threshold value, the communications manager 1405 (e.g., the TDD configuration manager 1410) may change the first TDD configuration to a more aggressive TDD configuration or provide for increased transmit power to be used at the aggressor UE. In an example where the TDD configuration manager 1410 determines the CLI measurements are below the threshold value, the communications manager 1405 (e.g., the TDD configuration manager 1410) may change the first TDD configuration to be less aggressive or provide for reduced transmit power to be used at the aggressor UE. The TDD configuration manager 1410 may output TDD configuration information 1445 to the resource pool configuration manager 1415. In some examples, the TDD configuration information 1445 may include a set of bits indicating a TDD configuration, modifications to the TDD configuration, or a combination thereof.

The resource pool configuration manager 1415 may configure a CLI resource pool based on the TDD configuration information 1445. The resource pool configuration manager 1415 may output CSI resource pool information 1450 to the CLI manager 1430, the CLI configuration manager 1420, or both. In some aspects, the CSI resource pool information 1450 may include a set of bits indicating a CLI resource pool and identified resources mapped to an RB-level bitmap. For example, the CSI resource pool information 1450 may include a set of bits indicating a number of CLI resources and associated CLI parameters for the CLI resources. In an example, the CLI resource pool included in the CSI resource pool information 1450 may provide a RB-level mapping between resources and one or more associated transmission or reception parameters (e.g., transmission bandwidth, transmission duration, time-frequency resource, cyclic shift, periodicity of CLI measurements, slot offset of the resource pool, frequency hopping pattern, reference signal base sequence, or any combinations thereof).

In an example aspect where the communications manager 1405 is of a first base station associated with, or serving, a first UE (e.g., a victim UE or an aggressor UE), the TDD configuration manager 1410 may identify a first TDD configuration for communications with at least the first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol.

In some examples, the TDD configuration manager 1410 may receive, from a second base station, a second TDD configuration 1436 for communications between the second base station and at least a second UE (e.g., an aggressor UE) served by the second base station. The second TDD configuration 1436 may include a set of bits indicating configurations associated with symbols of the second TDD configuration 1436 (e.g., for each symbol of a set of symbols within a slot, whether the symbol is a downlink symbol, an uplink symbol, a guard period symbol, or a flexible symbol that may be configured as either an uplink or downlink symbol). The second TDD configuration 1436 may be included in a TDD configuration received by the base station from the second base station (e.g., the TDD configuration 1344 as described herein).

The TDD configuration manager 1410 may forward the second TDD configuration 1436 to the resource pool configuration manager 1415, for example, within TDD configuration information 1445.

Based on the first TDD configuration and the second TDD configuration 1436, The resource pool configuration manager 1415 may determine a common resource pool configuration between the first base station and the second base station for CLI measurement based on the first TDD configuration and the second TDD configuration 1436, where the common resource pool configuration includes one or more parameters for measuring CLI for each symbol of the first TDD configuration that is capable of having a conflicting transmission direction with a corresponding symbol of the second TDD configuration 1436.

The resource pool configuration manager 1415 may output the common resource pool configuration to the first UE (e.g., via a transmitter of the base station), the second base station (e.g., via the transmitter of the base station), the CLI manager 1430, the CLI configuration manager 1420, or a combination thereof. The resource pool configuration manager 1415 may include the common resource pool configuration within the CSI resource pool information 1450 as described herein.

In some examples, the resource pool configuration manager 1415 may determine a symbol-level bitmap that indicates resources within one or more symbols of the second TDD configuration 1436 that are configured for uplink transmissions and that overlap with one or more downlink symbols or flexible symbols of the first TDD configuration. In some examples, the resource pool configuration manager 1415 may transmit a symbol-level bitmap to the first UE that indicates wireless resources of the common resource pool configuration for which the first UE is to measure a received SRS. The resource pool configuration manager 1415 may include the symbol-level bitmap within the CSI resource pool information 1450 as described herein.

In some cases, the CLI measurement is based on a measurement at the first UE of a SRS transmitted by the second UE, and where the one or more parameters for measuring CLI further include a SRS base sequence for the SRS transmitted by the second UE. In some cases, the one or more parameter measurements include one or more of a RSRP measurement, a RSSI measurement, or combinations thereof, that are based on a signal received at the first UE from the one or more other UEs.

In some cases, the symbol-level bitmap is based on a reference SCS that is different than a SCS of one or more of the first base station or the second base station. In some cases, the common resource pool configuration is partitioned into multiple resources each with the same size of time-frequency resource allocations.

The CLI coordination manager 1425 may receive a CLI measurement report (e.g., CLI report 1440) from the first UE that indicates the CLI measurements. In some examples, the CLI coordination manager 1425 may receive the CLI measurement report via CLI management information 1431 provided by the CLI manager 1430. In some examples, the CLI coordination manager 1425 may provide the CLI measurement report to the second base station as CLI reporting information 1460.

Figure 15:
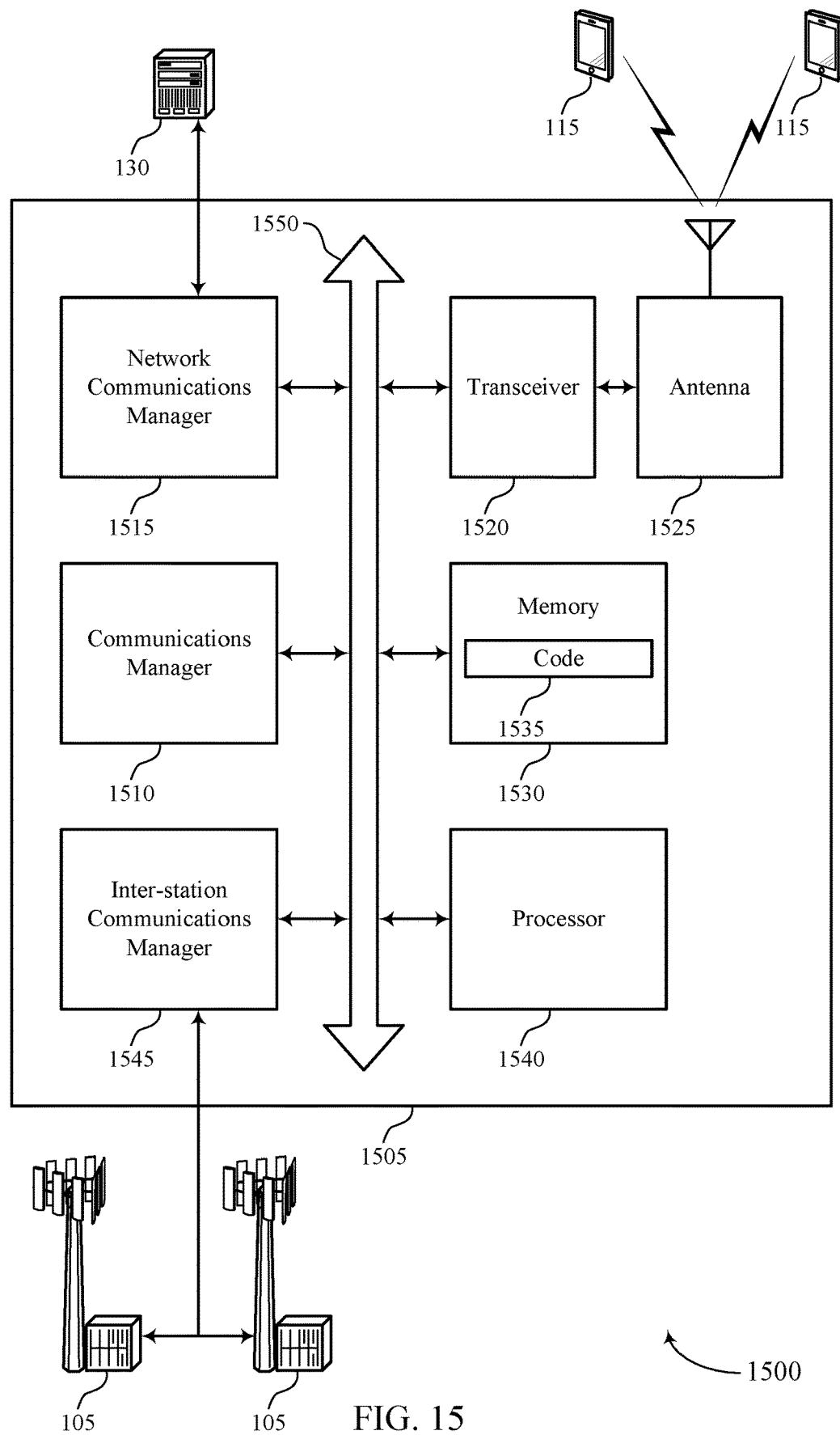
FIG. 15 shows a diagram of a system including a device that supports measurement and reporting for UE-to-UE cross-link interference in accordance with aspects of the present disclosure.

FIG. 15 shows a diagram of a system 1500 including a device 1505 that supports measurement and reporting for UE-to-UE cross-link interference in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a first TDD configuration for communications with at least a first UE served by the first base station, where the first TDD configuration indicates, for each symbol of a set of symbols within a slot, whether the symbol is a downlink symbol, an uplink symbol, a guard period symbol, or a flexible symbol that may be configured as either an uplink or downlink symbol, receive, from a second base station, a second TDD configuration for communications between the second base station and at least a second UE served by the second base station, determine a common resource pool configuration between the first base station and the second base station for CLI measurement based on the first TDD configuration and the second TDD configuration, where the common resource pool configuration includes one or more parameters for measuring CLI for each symbol of the first TDD configuration that is capable of having a conflicting transmission direction with a corresponding symbol of the second TDD configuration, and initiate the CLI measurement between the first UE and the second UE based on the common resource pool configuration.

The communications manager 1510 may also identify, for a first UE that is served by the first base station, one or more resource sets for measurement of CLI of one or more other UEs at the first UE, where each resource set includes one or more parameter measurements that are to be reported by the first UE, transmit an indication to the first UE of the identified one or more resource sets, and receive, from the first UE, a CLI report that includes the one or more parameter measurements of the first UE for each resource set.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may include more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting measurement and reporting for UE-to-UE cross-link interference).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

FIG. 16 shows a flowchart illustrating a method 1600 that supports measurement and reporting for UE-to-UE cross-link interference in accordance with aspects of the present disclosure. The operations of method 1600 may be implemented by a base station 105 or its components as described herein. For example, the operations of method 1600 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1605, the base station may be a first base station and may identify a first TDD configuration for communications with at least a first UE served by the first base station. The operations of 1605 may be performed according to the methods described herein. In some examples, aspects of the operations of 1605 may be performed by a TDD configuration manager as described with reference to FIGS. 12 through 15. In some cases, the first TDD configuration indicates, for each symbol of a set of symbols within a slot, whether the symbol is a downlink symbol, an uplink symbol, a guard period symbol, or a flexible symbol that may be configured as either an uplink or downlink symbol At 1610, the first base station may receive, from a second base station, a second TDD configuration for communications between the second base station and at least a second UE served by the second base station. The operations of 1610 may be performed according to the methods described herein. In some examples, aspects of the operations of 1610 may be performed by a TDD configuration manager as described with reference to FIGS. 12 through 15. In some cases, the second TDD configuration may be received responsive to an indication provided to the second base station that CLI is detected at a UE served by the first base station.

At 1615, the first base station may determine a common resource pool configuration between the first base station and the second base station for CLI measurement based on the first TDD configuration and the second TDD configuration. The operations of 1615 may be performed according to the methods described herein. In some examples, aspects of the operations of 1615 may be performed by a resource pool configuration manager as described with reference to FIGS. 12 through 15. In some cases, the common resource pool configuration includes one or more parameters for measuring CLI for each symbol of the first TDD configuration that is capable of having a conflicting transmission direction with a corresponding symbol of the second TDD configuration. In some cases, the one or more parameters for measuring CLI include one or more of a transmission bandwidth, a transmission duration, a periodicity and slot offset of the resource pool, or any combinations thereof. In some cases, the CLI measurement is based on a measurement at the first UE of a SRS transmitted by the second UE, and where the one or more parameters for measuring CLI further include a SRS base sequence for the SRS transmitted by the second UE.

In some cases, the first base station may determine a symbol-level bitmap that indicates resources within one or more symbols of the second TDD configuration that are configured for uplink transmissions and that overlap with one or more downlink symbols or flexible symbols of the first TDD configuration. In some cases, the symbol-level bitmap indicates one or more RBs within one or more symbols of the second TDD configuration that are configured for uplink transmissions and that overlap with downlink symbol RBs or flexible symbol RBs of the first TDD configuration. In some cases, the symbol-level bitmap is based on a reference SCS that is different than a SCS of one or more of the first base station or the second base station.

At 1620, the first base station may initiate the CLI measurement between the first UE and the second UE based on the common resource pool configuration. The operations of 1620 may be performed according to the methods described herein. In some examples, aspects of the operations of 1620 may be performed by a CLI manager as described with reference to FIGS. 12 through 15. In some cases, the CLI measurement may include a CLI measurement duration, and a CLI measurement periodicity.

FIG. 17 shows a flowchart illustrating a method 1700 that supports measurement and reporting for UE-to-UE cross-link interference in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may be a first base station and may identify a first TDD configuration for communications with at least a first UE served by the first base station. The operations of 1705 may be performed according to the methods described herein. In some examples, aspects of the operations of 1705 may be performed by a TDD configuration manager as described with reference to FIGS. 12 through 15. In some cases, the first TDD configuration indicates, for each symbol of a set of symbols within a slot, whether the symbol is a downlink symbol, an uplink symbol, a guard period symbol, or a flexible symbol that may be configured as either an uplink or downlink symbol.

At 1710, the first base station may receive, from a second base station, a second TDD configuration for communications between the second base station and at least a second UE served by the second base station. The operations of 1710 may be performed according to the methods described herein. In some examples, aspects of the operations of 1710 may be performed by a TDD configuration manager as described with reference to FIGS. 12 through 15.

At 1715, the first base station may determine a common resource pool configuration between the first base station and the second base station for CLI measurement based on the first TDD configuration and the second TDD configuration. The operations of 1715 may be performed according to the methods described herein. In some examples, aspects of the operations of 1715 may be performed by a resource pool configuration manager as described with reference to FIGS. 12 through 15. In some cases, the common resource pool configuration includes one or more parameters for measuring CLI for each symbol of the first TDD configuration that is capable of having a conflicting transmission direction with a corresponding symbol of the second TDD configuration.

At 1720, the first base station may transmit a CLI configuration to the first UE, where the CLI configuration is based on the common resource pool configuration and indicates wireless resources on which CLI is to be measured. The operations of 1720 may be performed according to the methods described herein. In some examples, aspects of the operations of 1720 may be performed by a CLI manager as described with reference to FIGS. 12 through 15. In some cases, the CLI configuration is a symbol-level bitmap that is provided the first UE that indicates wireless resources of the common resource pool configuration for which the first UE is to measure a received signal.

At 1725, the first base station may receive a CLI measurement report from the first UE that indicates the CLI measurements. The operations of 1725 may be performed according to the methods described herein. In some examples, aspects of the operations of 1725 may be performed by a CLI coordination manager as described with reference to FIGS. 12 through 15.

At 1730, the first base station may provide the CLI measurement report to the second base station. The operations of 1730 may be performed according to the methods described herein. In some examples, aspects of the operations of 1730 may be performed by a CLI coordination manager as described with reference to FIGS. 12 through 15.

FIG. 18 shows a flowchart illustrating a method 1800 that supports measurement and reporting for UE-to-UE cross-link interference in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, a first base station may serve an aggressor first UE, and may identify a first TDD configuration for communications with at least the first UE served by the first base station. The operations of 1805 may be performed according to the methods described herein. In some examples, aspects of the operations of 1805 may be performed by a TDD configuration manager as described with reference to FIGS. 12 through 15. In some cases, the first TDD configuration indicates, for each symbol of a set of symbols within a slot, whether the symbol is a downlink symbol, an uplink symbol, a guard period symbol, or a flexible symbol that may be configured as either an uplink or downlink symbol.

At 1810, the first base station may receive, from a second base station, a second TDD configuration for communications between the second base station and at least a second UE served by the second base station that is a victim UE. The operations of 1810 may be performed according to the methods described herein. In some examples, aspects of the operations of 1810 may be performed by a TDD configuration manager as described with reference to FIGS. 12 through 15.

At 1815, the first base station may determine a common resource pool configuration between the first base station and the second base station for CLI measurement based on the first TDD configuration and the second TDD configuration. The operations of 1815 may be performed according to the methods described herein. In some examples, aspects of the operations of 1815 may be performed by a resource pool configuration manager as described with reference to FIGS. 12 through 15. In some cases, the common resource pool configuration includes one or more parameters for measuring CLI for each symbol of the first TDD configuration that is capable of having a conflicting transmission direction with a corresponding symbol of the second TDD configuration.

At 1820, the first base station may transmit a CLI configuration to the first UE, where the CLI configuration is based on the common resource pool configuration and indicates wireless resources on which the first UE is to transmit one or more SRSs. The operations of 1825 may be performed according to the methods described herein. In some examples, aspects of the operations of 1825 may be performed by a CLI manager as described with reference to FIGS. 12 through 15. In some cases, first UE is configured with the common resource pool configuration, and the transmitting the CLI configuration to the first UE includes transmitting a symbol-level bitmap to the first UE that indicates wireless resources of the common resource pool configuration on which the first UE is to transmit a SRS. In some cases, the CLI configuration indicates that the first UE is to use one or more uplink transmission parameters for the one or more SRSs that are based on a prior uplink shared channel or uplink control channel transmission using corresponding resources within the slot on which the first UE is to transmit the one or more SRSs.

At 1825, the first base station may receive a CLI measurement report from the second base station that indicates CLI measurements of the second UE that are measured in accordance with the CLI configuration. The operations of 1825 may be performed according to the methods described herein. In some examples, aspects of the operations of 1825 may be performed by a CLI coordination manager as described with reference to FIGS. 12 through 15.

At 1830, the first base station may modify one or more transmission parameters of the first UE based on the CLI measurement report. The operations of 1830 may be performed according to the methods described herein. In some examples, aspects of the operations of 1830 may be performed by a CLI coordination manager as described with reference to FIGS. 12 through 15.

FIG. 19 shows a flowchart illustrating a method 1900 that supports measurement and reporting for UE-to-UE cross-link interference in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may identify one or more resource sets for measuring CLI from one or more other UEs, where each resource set includes one or more parameter measurements that are to be reported by the first UE. The operations of 1905 may be performed according to the methods described herein. In some examples, aspects of the operations of 1905 may be performed by a CLI resource manager as described with reference to FIGS. 8 through 11. In some cases, the one or more parameter measurements include one or more of a RSRP measurement, a RSSI measurement, or combinations thereof, to be reported based on a signal received at the first UE from the one or more other UEs. In some cases, a number of parameter measurements to be reported for each resource set may be identified and, for each parameter measurement, an associated RI within the corresponding resource set that is to be reported with each parameter measurement may be determined. In some cases, the one or more resource sets and the number of parameter measurements to be reported for each resource set are received in configuration signaling from a base station.

At 1910, the UE may measure, for each resource set, one or more reference signals received at the first UE from the one or more other UEs. The operations of 1910 may be performed according to the methods described herein. In some examples, aspects of the operations of 1910 may be performed by a measurement component as described with reference to FIGS. 8 through 11. In some cases, the signal received at the first UE from the one or more other UEs is a SRS or an uplink transmission signal transmitted by the one or more other UEs.

At 1915, the UE may determine, based on the measuring, the one or more parameter measurements for each resource set. The operations of 1915 may be performed according to the methods described herein. In some examples, aspects of the operations of 1915 may be performed by a measurement component as described with reference to FIGS. 8 through 11.

At 1920, the UE may transmit a CLI report to a base station that includes the one or more parameter measurements for each resource set. The operations of 1920 may be performed according to the methods described herein. In some examples, aspects of the operations of 1920 may be performed by a CLI transmission manager as described with reference to FIGS. 8 through 11.

FIG. 20 shows a flowchart illustrating a method 2000 that supports measurement and reporting for UE-to-UE cross-link interference in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may be a first base station and may identify, for a first UE that is served by the first base station, one or more resource sets for measurement of CLI of one or more other UEs at the first UE, where each resource set includes one or more parameter measurements that are to be reported by the first UE. The operations of 2005 may be performed according to the methods described herein. In some examples, aspects of the operations of 2005 may be performed by a resource pool configuration manager as described with reference to FIGS. 12 through 15. In some cases, the one or more parameter measurements include one or more of a RSRP measurement, a RSSI measurement, or combinations thereof, that are based on a signal received at the first UE from the one or more other UEs. In some cases, the base station may identify a number of parameter measurements to be reported for each resource set and, for each parameter measurement, an associated RI within the corresponding resource set that is to be reported with each parameter measurement. In some cases, the base station may configure the first UE with a common resource pool configuration that includes a set of resource sets for measurement of CLI, and where the transmitting the indication includes transmitting a bitmap indicating the one or more resource sets from the common resource pool configuration, where each resource set is associated with a bit in the bitmap.

At 2010, the first base station may transmit an indication to the first UE of the identified one or more resource sets. The operations of 2025 may be performed according to the methods described herein. In some examples, aspects of the operations of 2025 may be performed by a resource pool configuration manager as described with reference to FIGS. 12 through 15. In some cases, the base station may transmit configuration signaling to the first UE that indicates the one or more resource sets and the number of parameter measurements to be reported for each resource set.

At 2035, the first base station may receive, from the first UE, a CLI report that includes the one or more parameter measurements of the first UE for each resource set. The operations of 2035 may be performed according to the methods described herein. In some examples, aspects of the operations of 2035 may be performed by a CLI manager as described with reference to FIGS. 12 through 15.

FIG. 21 shows a flowchart illustrating a method 2100 that supports measurement and reporting for UE-to-UE cross-link interference in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may receive an indication from a base station to transmit one or more SRSs for CLI measurement using one or more resource sets. The operations of 2105 may be performed according to the methods described herein. In some examples, aspects of the operations of 2105 may be performed by a CLI configuration manager as described with reference to FIGS. 8 through 11.

At 2110, the UE may apply one or more transmission parameters to the one or more SRSs to be transmitted using the one or more resource sets, where the one or more transmission parameters are determined based on a most recent uplink transmission to the base station using the corresponding resource set. The operations of 2110 may be performed according to the methods described herein. In some examples, aspects of the operations of 2110 may be performed by a CLI transmission manager as described with reference to FIGS. 8 through 11. In some cases, the one or more transmission parameters include one or more of a transmission precoding parameter, a number of antenna ports, or any combinations thereof. In some cases, the one or more transmission parameters include a transmission precoding parameter that is based on a TPMI received from the base station in a most recent uplink grant for a codebook-based uplink shared channel transmission. In some cases, the one or more transmission parameters include a transmission precoding parameter that is based on a SRS resource indicator (SRI) received from the base station in a most recent uplink grant for a non-codebook-based uplink shared channel transmission.

At 2130, the UE may transmit the one or more SRSs based on the applying of the transmission parameters to the one or more SRSs. The operations of 2130 may be performed according to the methods described herein. In some examples, aspects of the operations of 2130 may be performed by a CLI transmission manager as described with reference to FIGS. 8 through 11.

FIG. 22 shows a flowchart illustrating a method 2200 that supports measurement and reporting for UE-to-UE cross-link interference in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2205, the UE may receive an indication from a base station to transmit one or more SRSs for CLI measurement using one or more resource sets. The operations of 2205 may be performed according to the methods described herein. In some examples, aspects of the operations of 2205 may be performed by a CLI configuration manager as described with reference to FIGS. 8 through 11.

At 2210, the UE may identify a first resource set of the one or more resource sets that corresponds to resources used in a prior uplink control channel transmission and a second resource set of the one or more resource sets that corresponds to resources used in a prior uplink shared channel transmission. The operations of 2210 may be performed according to the methods described herein. In some examples, aspects of the operations of 2210 may be performed by a CLI transmission manager as described with reference to FIGS. 8 through 11.

At 2215, the UE may apply a same transmission scheme and uplink power control as the prior uplink control channel transmission to generate a non-precoded single port SRS transmission via the first resource set. The operations of 2215 may be performed according to the methods described herein. In some examples, aspects of the operations of 2215 may be performed by a CLI transmission manager as described with reference to FIGS. 8 through 11.

At 2220, the UE may apply a transmission precoding, number of antenna ports, and transmission power that is aligned with the prior uplink shared channel transmission to generate a precoded multi-port SRS transmission via the second resource set. The operations of 2220 may be performed according to the methods described herein. In some examples, aspects of the operations of 2220 may be performed by a CLI transmission manager as described with reference to FIGS. 8 through 11. In some cases, the first resource set and the second resource set occupy different symbols within a slot.

At 2225, the UE may transmit the one or more SRSs based on the applying. The operations of 2225 may be performed according to the methods described herein. In some examples, aspects of the operations of 2225 may be performed by a CLI transmission manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at first user equipment (UE), comprising:

receiving, from a serving base station, information indicating one or more resource sets from a common resource pool configuration, wherein the information provides an indication for each resource set of the one or more resource sets, wherein each resource set is for measuring cross-link interference (CLI) from one or more other UEs, and wherein each resource set is associated with one or more parameter measurements that are to be reported by the first UE;

receiving, from the serving base station, a mapping that indicates one or more parameters for measuring CLI, wherein the one or more parameters include a sounding reference signal (SRS) base sequence when CLI measurement at the first UE is based on an SRS transmission of the one or more other UEs;

measuring, for each resource set and based on the one or more parameters, one or more reference signals received at the first UE from the one or more other UEs;

determining, based at least in part on the measuring the one or more reference signals, the one or more parameter measurements for each resource set; and transmitting a CLI report to a base station that includes the one or more parameter measurements for each resource set.

2. The method of claim 1, wherein the one or more parameter measurements include one or more of a reference signal received power (RSRP) measurement, a received signal strength indicator (RSSI) measurement, or combinations thereof, to be reported based on a signal received at the first UE from the one or more other UEs.

3. The method of claim 2, wherein the signal received at the first UE from the one or more other UEs is an SRS or an uplink transmission signal transmitted by the one or more other UEs.

4. The method of claim 1, further comprising:

identifying a number of parameter measurements to be reported by the first UE for each resource set and, for each parameter measurement, an associated resource index (RI) within a corresponding resource set that is to be reported by the first UE with each parameter measurement.

5. The method of claim 4, wherein the one or more resource sets and the number of parameter measurements to be reported by the first UE for each resource set are received at the first UE in configuration signaling from the base station.

6. The method of claim 1, wherein the first UE is a victim UE and the one or more resource sets are each associated with an aggressor UE.

7. A method for wireless communication at a first base station, comprising:

identifying, for a first user equipment (UE) that is served by the first base station, one or more resource sets from a common resource pool configuration, wherein each resource set of the one or more resource sets is for measurement of cross-link interference (CLI) of one or more other UEs at the first UE, and wherein each resource set is associated with one or more parameter measurements that are to be reported by the first UE;

transmitting, to the first UE, information indicating the identified one or more resource sets, wherein the information provides an indication for each resource set of the one or more resource sets;

transmitting, to the first UE, a mapping that indicates one or more parameters for measuring CLI, wherein the one or more parameters include a sounding reference signal (SRS) base sequence when CLI measurement at the first UE is based on an SRS transmission of the one or more other UEs; and receiving, from the first UE, a CLI report that includes the one or more parameter measurements of the first UE for each resource set.

8. The method of claim 7, wherein the one or more parameter measurements include one or more of a reference signal received power (RSRP) measurement, a received signal strength indicator (RSSI) measurement, or combinations thereof, that are based on a signal received at the first UE from the one or more other UEs.

9. The method of claim 8, wherein the signal received at the first UE from the one or more other UEs is an SRS or an uplink transmission signal transmitted by the one or more other UEs.

10. The method of claim 7, wherein the identifying the one or more resource sets further comprises:

identifying a number of parameter measurements to be reported by the first UE for each resource set and, for each parameter measurement, an associated resource index (RI) within a corresponding resource set that is to be reported by the first UE with each parameter measurement.

11. The method of claim 10, wherein the transmitting the information comprises:

transmitting configuration signaling to the first UE that indicates the one or more resource sets and the number of parameter measurements to be reported by the first UE for each resource set.

12. The method of claim 7, further comprising:

configuring the first UE with the common resource pool configuration that includes a plurality of resource sets for measurement of CLI.

13. An apparatus for wireless communication at first user equipment (UE), comprising:

at least one processor; and at least one memory coupled with the at least one processor, with instructions stored in the at least one memory, the instructions being executable by the at least one processor to cause the apparatus to:

receive, from a serving base station, information indicating one or more resource sets from a common resource pool configuration, wherein the information provides an indication for each resource set of the one or more resource sets, wherein each resource set is for measuring cross-link interference (CLI) from one or more other UEs, and wherein each resource set is associated with one or more parameter measurements that are to be reported by the first UE;

receive, from the serving base station, a mapping that indicates one or more parameters for measuring CLI, wherein the one or more parameters include a sounding reference signal (SRS) base sequence when CLI measurement at the first UE is based on an SRS transmission of the one or more other UEs;

measure, for each resource set and based on the one or more parameters, one or more reference signals received at the first UE from the one or more other UEs;

determine, based at least in part on the measuring the one or more reference signals, the one or more parameter measurements for each resource set; and transmit a CLI report to a base station that includes the one or more parameter measurements for each resource set.

14. The apparatus of claim 13, wherein the one or more parameter measurements include one or more of a reference signal received power (RSRP) measurement, a received signal strength indicator (RSSI) measurement, or combinations thereof, to be reported based on a signal received at the first UE from the one or more other UEs.

15. The apparatus of claim 14, wherein the signal received at the first UE from the one or more other UEs is an SRS or an uplink transmission signal transmitted by the one or more other UEs.

16. The apparatus of claim 13, wherein the instructions are further executable by the at least one processor to cause the apparatus to:

identify a number of parameter measurements to be reported by the first UE for each resource set and, for each parameter measurement, an associated resource index (RI) within a corresponding resource set that is to be reported by the first UE with each parameter measurement.

17. The apparatus of claim 16, wherein the one or more resource sets and the number of parameter measurements to be reported by the first UE for each resource set are received at the first UE in configuration signaling from the base station.

18. The apparatus of claim 13, wherein the first UE is a victim UE and the one or more resource sets are each associated with an aggressor UE.

19. An apparatus for wireless communication at a first base station, comprising:

at least one processor; and at least one memory coupled with the at least one processor, with instructions stored in the at least one memory, the instructions being executable by the at least one processor to cause the apparatus to:

identify, for a first user equipment (UE) that is served by the first base station, one or more resource sets from a common resource pool configuration, wherein each resource set of the one or more resource sets is for measurement of cross-link interference (CLI) of one or more other UEs at the first UE, and wherein each resource set is associated with one or more parameter measurements that are to be reported by the first UE;

transmit, to the first UE, information indicating the identified one or more resource sets, wherein the information provides an indication for each resource set of the one or more resource sets;

transmit, to the first UE, a mapping that indicates one or more parameters for measuring CLI, wherein the one or more parameters include a sounding reference signal (SRS) base sequence when CLI measurement at the first UE is based on an SRS transmission of the one or more other UEs; and receive, from the first UE, a CLI report that includes the one or more parameter measurements of the first UE for each resource set.

20. The apparatus of claim 19, wherein the one or more parameter measurements include one or more of a reference signal received power (RSRP) measurement, a received signal strength indicator (RSSI) measurement, or combinations thereof, that are based on a signal received at the first UE from the one or more other UEs.

21. The apparatus of claim 20, wherein the signal received at the first UE from the one or more other UEs is an SRS or an uplink transmission signal transmitted by the one or more other UEs.

22. The apparatus of claim 19, wherein the instructions to identify the one or more resource sets are further executable by the at least one processor to cause the apparatus to:

identify a number of parameter measurements to be reported by the first UE for each resource set and, for each parameter measurement, an associated resource index (RI) within a corresponding resource set that is to be reported by the first UE with each parameter measurement.

23. The apparatus of claim 22, wherein the instructions to transmit the information are further executable by the at least one processor to cause the apparatus to:

transmit configuration signaling to the first UE that indicates the one or more resource sets and the number of parameter measurements to be reported by the first UE for each resource set.

24. The apparatus of claim 19, wherein the instructions are further executable by the at least one processor to cause the apparatus to:

configure the first UE with the common resource pool configuration that includes a plurality of resource sets for measurement of CLI.

*  *  *  *  *